(12) United States Patent
Maki et al.

(10) Patent No.: US 8,156,369 B2
(45) Date of Patent: Apr. 10, 2012

(54) REMOTE COPYING MANAGEMENT SYSTEM, METHOD AND APPARATUS

(75) Inventors: Nobuhiro Maki, Yokohama (JP); Hiroshi Yamamoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 175 days.

(21) Appl. No.: 12/365,197

(22) Filed: Feb. 4, 2009

(65) Prior Publication Data
US 2010/0122051 A1    May 13, 2010

(30) Foreign Application Priority Data
Nov. 7, 2008   (JP) ................................ 2008-286049

(51) Int. Cl.
  *G06F 11/00*   (2006.01)
(52) U.S. Cl. .............. 714/6.3; 714/6.1; 714/43; 714/5.1
(58) Field of Classification Search .................. None
  See application file for complete search history.

(56) References Cited

U.S. PATENT DOCUMENTS

| | | | |
|---|---|---|---|
| 7,107,483 B2 * | 9/2006 | Duncan et al. .................... 714/6 |
| 7,191,303 B2 | 3/2007 | Yamamoto et al. | |
| 7,225,190 B2 | 5/2007 | Iwamura et al. | |
| 7,565,570 B2 * | 7/2009 | Dohi ................................ 714/6 |
| 2004/0098637 A1 * | 5/2004 | Duncan et al. .................... 714/6 |
| 2006/0107098 A1 | 5/2006 | Maki et al. | |
| 2007/0168705 A1 * | 7/2007 | Dohi ................................ 714/6 |
| 2008/0229039 A1 | 9/2008 | Maki et al. | |

FOREIGN PATENT DOCUMENTS

JP    2001-109699    4/2001

* cited by examiner

*Primary Examiner* — Christopher McCarthy
(74) *Attorney, Agent, or Firm* — Antonelli, Terry, Stout & Kraus, LLP.

(57) ABSTRACT

A management system for managing storage systems, having first correspondence information concerned with correspondence of copy pairs with copy groups as setting of remote copying of data in logical volumes of the storage systems, and second correspondence information concerned with correspondence of physical paths and logical paths between the storage systems with the copy groups, wherein when failure information designating a certain physical path is received, a copy group affected by failure in the certain physical path is specified and displayed by referring to the first correspondence information and the second correspondence information. Consequently, physical paths can be monitored from the viewpoint of remote copying.

18 Claims, 35 Drawing Sheets

COPY INFORMATION ENTRY — 113

| | 11300 | COPY GROUP ID<br>Grip 1 |
| | 11301 | COPY INFORMATION<br>ASYNCHRONOUS REMOTE COPY |
| | 11302 | COPY STATE<br>COPYING |

| PAIR ID | PRIMARY SITE ID | SECONDARY SITE ID | PRIMARY STORAGE SYSTEM ID | PRIMARY VOLUME ID | SECONDARY STORAGE SYSTEM ID | SECONDARY VOLUME ID | EXTENDED COPY GROUP ID |
|---|---|---|---|---|---|---|---|
| 1 | PRIMARY 1 | REMOTE 1 | 14001 | 23:10 | 14005 | 23:20 | |
| 2 | PRIMARY 1 | REMOTE 1 | 14001 | 33:10 | 14005 | 23:20 | |
| ⋯ | ⋯ | ⋯ | ⋯ | ⋯ | ⋯ | ⋯ | |
| 11303 | 11304 | 11305 | 11306 | 11307 | 11308 | 11309 | 11310 |

SITE ID

LOGICAL PATH INFORMATION SET

| LOGICAL PATH ID | PATH TYPE | PRIMARY STORAGE SYSTEM ID | PRIMARY REPRESENTATIVE VOLUME | SECONDARY STORAGE SYSTEM ID | SECONDARY REPRESENTATIVE VOLUME | RELEVANT PHYSICAL PATH ID |
|---|---|---|---|---|---|---|
| 001 | CU | 14001 | 23:10 | 14005 | 23:20 | 001,002 |
| 002 | VOLUME | 14001 | 23:40 | 14005 | 24:FF | 001 |
| .. | .. | .. | .. | .. | .. | .. |

11501　11502　11503　11504　11505　11506　11507

PHYSICAL PATH INFORMATION SET

| PHYSICAL PATH ID | PRIMARY STORAGE SYSTEM ID | PRIMARY PORT ID | SECONDARY STORAGE SYSTEM ID | SECONDARY PORT ID | PATH STATE |
|---|---|---|---|---|---|
| 001 | 14001 | 23:10:01 | 14005 | 23:20:01 | |
| 002 | 14001 | 23:10:02 | 14005 | 24:FF:01 | |
| .. | .. | .. | .. | .. | |

11511　11512　11513　11514　11515　11516

PATH INFORMATION ~115

FIG. 12

COPY PAIR MANAGEMENT INFORMATION 1210

| COPY GROUP ID | PAIR ID | VOLUME ID | COPY STATE INFORMATION | COPY TARGET STORAGE SYSTEM ID | COPY TARGET VOLUME ID | COPY TYPE | EXTENDED COPY GROUP ID |
|---|---|---|---|---|---|---|---|
| GRP1 | 1 | 23:10 | | 14005 | 23:20 | ASYNC | |
| GRP2 | 2 | 23:40 | | 14005 | 24:FF | ASYNC | |
| .. | .. | .. | .. | .. | .. | .. | .. |

VOLUME MANAGEMENT INFORMATION 1250

| LOGICAL VOLUME ID | VOLUME STATE INFORMATION | CAPACITY | COPY PAIR ID | COPY GROUP ID |
|---|---|---|---|---|
| 23:10 |  | 10GB | 1 | GRP1 |
| 23:40 |  | 10GB | 2 | GRP2 |
| .. | .. | .. | .. | .. |
| 12501 | 12502 | 12503 | 12504 | 12505 |

FIG. 18

PATH TYPE: ☒ CU ☐ STORAGE ☐ VOLUME

PRIMARY STORAGE: ☒ 14001 ☐ 15001

PRIMARY REPRESENTATIVE VOLUME: ☒ 23:10 ☐ 23:11 ☐ 23:12

PRIMARY STORAGE PORT ID: ☒ 23:10:01 ☐ 23:10:02

SECONDARY STORAGE: ☒ 14002 ☐ 15002

SECONDARY REPRESENTATIVE VOLUME: ☒ 23:02 ☐ 24:FF

SECONDARY STORAGE PORT ID: ☒ 23:20:01 ☐ 24:FF:01

FIG. 20

| COPY NAME: | GRP 1 |
| --- | --- |

COPY TYPE: ☑ ASYNCHRONOUS REMOTE COPY
☐ SYNCHRONOUS REMOTE COPY

PRIMARY SITE: PRIMARY 1    SECONDARY SITE: REMOTE 1

PRIMARY STORAGE: ☑ 14001 ☐ 15001

PRIMARY VOLUME: ☑ 23:10 ☐ 23:11 ☐ 23:12

SECONDARY STORAGE: ☑ 14002 ☐ 15002

SECONDARY VOLUME: ☑ 23:20 ☐ 23:21 ☐ 24:FF

COPY OPTION INFORMATION: SVOL OVERWRITE

FIG. 24

LOGICAL PATH INFORMATION SET

| LOGICAL PATH ID | PATH TYPE | REPRESENTATIVE VOLUME | TARGET STORAGE SYSTEM ID | SECONDARY REPRESENTATIVE VOLUME | RELEVANT PHYSICAL PATH ID | COUPLING DIRECTION |
|---|---|---|---|---|---|---|
| 001 | CU | 23:10 | 14005 | 23:20 | 001,002 | UP |
| 002 | VOLUME | 23:40 | 14005 | 24:FF | 23:20 | UP |
| .. | .. | .. | .. | .. | .. | .. |

122001 122002 122003 122004 122005 122006 122007

PHYSICAL PATH INFORMATION SET

| PHYSICAL PATH ID | PORT ID | TARGET STORAGE SYSTEM ID | TARGET PORT ID | PHYSICAL PATH STATE |
|---|---|---|---|---|
| 001 | 23:10:01 | 14005 | 23:20:01 | ACTIVE |
| 002 | 23:10:02 | 14005 | 24:FF:01 | ACTIVE |
| .. | .. | .. | .. | .. |

122011 122012 122013 122014 122015

PATH MANAGEMENT INFORMATION 1220

DATA TRANSFER FRAME

FIG. 31

PRIMARY STORAGE — PHYSICAL PATH / LOGICAL PATH — SECONDARY STORAGE

PHYSICAL PATH STATE

| PATH ID | PRIMARY STORAGE ID | PRIMARY PORT ID | SECONDARY STORAGE ID | SECONDARY PORT ID | STATE |
|---|---|---|---|---|---|
| 001 | 14001 | 23:10:01 | 14005 | 23:20:21 | LINK DOWN |
| 002 | 14001 | 23:10:01 | 14005 | 23:20:21 | ACTIVE |

LOGICAL PATH STATE

| PATH ID | PATH TYPE | PRIMARY STORAGE ID | PRIMARY REPRESENTATIVE VOLUME | SECONDARY STORAGE ID | SECONDARY REPRESENTATIVE VOLUME | STATE |
|---|---|---|---|---|---|---|
| 001 | CU | 14001 | 23:10 | 14005 | 23:20 | ACTIVE |

RELEVANT REMOTE COPYING

| COPY ID | LOGICAL PATH | AFFECTION |
|---|---|---|
| GRP1 | 001 | PERFORMANCE DOWN |

REMOTE COPYING MANAGEMENT SYSTEM, METHOD AND APPARATUS

INCORPORATION BY REFERENCE

The present application claims priority from Japanese application JP2008-286049 filed on Nov. 11, 2008, the content of which is hereby incorporated by reference.

BACKGROUND

The present invention relates to a storage system and a copying method implemented between plural geographically separated sites.

Continuity of an IT (information technology) system having a host computer and a storage system and reliability of data stored in the storage system have become very important as IT has become popular. There is an increasing demand for protecting data from unexpected accidents such as terrorism, natural disaster, etc. Remote copying by a storage system is one of techniques supporting such a demand. Remote copying is a technique in which update data stored in a copy source volume included in a copy source storage system is copied to a copy destination volume included in a copy destination storage system so that the data can be conserved in the copy destination volume even when an event of making the data disappear from the copy source volume (e.g. natural disaster such as a fire, an earthquake, a flood, etc. or power failure) occurred.

As disclosed in U.S. Pat. No. 7,225,190, update data issued from a host computer to a storage system is copied by the storage system so that one data is stored in the storage system and the other copied data is transferred to a remote storage system and stored in the remote storage system. This procedure permits the storage system to be recovered by use of the data stored in the remote storage system even after some failure occurred in the storage system because of disaster or the like.

Remote copying disclosed in U.S. Pat. No. 7,225,190 is a technique called synchronous remote copying. In this technique, unless the data issued from the host computer to the storage system is completely stored in the remote storage system, the host computer does not receive a report of completion of the data. This procedure guarantees the data to be stored in the remote storage system if a report of completion of the data has been already received by the host computer.

On the other hand, an asynchronous remote copying technique has been disclosed in U.S. Pat. No. 7,191,303. According to U.S. Pat. No. 7,191,303, a report of completion of update data issued from a host computer to a storage system is received by the host computer as soon as the data is received by the storage system. The data received by the storage system is copied asynchronously with processing of the completion report so that the copied data is transferred to a remote storage system and stored in the remote storage system. This procedure permits the host computer to perform data input/output processing independent of the data transfer distance between the storage systems.

The achievement of remote copying by storage systems can reduce the copying load imposed on the host computer but needs monitoring and operating of remote copying from a management computer or the host computer. For this reason, each storage system holds information of a copying state (e.g. as to whether copying is operating normally, whether initial copying is currently made, whether copying is suspended for some reason, etc.) for a pair of the copy source volume and the copy destination volume and transmits the copying state to the management computer or the host computer. The management computer or the host computer refers to the copying state to monitor the pair whether failure occurred or not.

On the other hand, remote copying uses a path technique for transmission/reception of data between storage systems. For example, the path technique has been disclosed in JP-A-2001-109699. In JP-A-2001-109699, logical communication lines (referred to as logical paths) are formed on a physical communication line (referred to as physical path) coupled between storage systems geographically separated from each other so that data for remote copying is transmitted/received on the logical path. This procedure permits plural logical paths to be formed on a physical path even when plural remote copying processes are performed between the storage systems, so that the physical path can be shared to the plural remote copying processes.

Assume now that failure occurs in the physical path when plural remote copying processes are being executed between storage systems.

According to U.S. Pat. No. 7,225,190, there is no data transmission between storage systems unless the host computer issues update data to any storage system. For this reason, the storage system cannot detect the physical path failure caused by communication line failure unless the host computer issues update data.

According to U.S. Pat. No. 7,191,303, in asynchronous remote copying, even when there is failure in the physical path, an administrator cannot detect the physical path failure as a remote copying failure immediately because data transmission is temporarily reserved in the storage system on the data transmission source site.

According to JP-A-2001-109699, because plural and arbitrary logical paths can be formed on one physical path so that data for any remote copying can be received/transmitted on each logical path, it is impossible to specify the remote copying affected by failure in the physical path.

As described above, in the related art, it was difficult to monitor the physical paths from the viewpoint of remote copying.

SUMMARY

The present invention provides a management system, a data storage system having a management system and a plurality of storage systems, and a method, an apparatus, a system, a program and a recording medium for storage management in a computer system having a computer coupled to a data storage system.

More specifically, a management system for managing storage systems has first correspondence information concerned with correspondence of copy pairs with copy groups as setting of remote copying of data in logical volumes of the storage systems, and second correspondence information concerned with correspondence of physical paths and logical paths between the storage systems with the copy groups, wherein when failure information designating a certain physical path is received, a copy group affected by failure in the certain physical path is specified and displayed by referring to the first correspondence information and the second correspondence information.

According to an aspect of the invention, there is provided a data storage system comprising:

a first storage system, which has first storage ports and first logical volumes which store write data received from the computer coupled to the first storage system;

a second storage system, which has second storage ports coupled to the first storage ports, and second logical volumes which store copies of data of the first logical volumes by remote copying; and a management system, which stores copy information which holds correspondence of copy pairs formed from the first logical volumes and the second logical volumes with copy groups concerned with a sequence of write data in the computer, wherein the management system stores path remote copy relevant information which indicates correspondence of physical paths including the first storage ports and the second storage ports, logical paths, and the copy groups by remote copying, and wherein the management system receives failure information designating a certain physical path included in the physical paths, and specifies a certain logical path which is part of the logical paths and which corresponds to the certain physical path and a certain copy group which is one of the copy groups and which corresponds to the certain logical path, by referring to the path remote copy relevant information, and displays identification information of the certain copy group as a copy group affected by the failure in the certain physical path.

The data storage system may further have a communication apparatus coupled to part or all of the first storage ports and part or all of the second storage ports, wherein the failure information may be transmitted by any one of the first storage system, the second storage system or the communication apparatus, or performance information concerned with remote copying of the certain group may be displayed with reception of the failure information as a turning point.

The copy information may hold respective copy types of the copy groups and the copy type of the certain copy group may be specified based on the copy information so that information displayed as the performance information is changed based on the copy type. Or the management system may receive information concerned with respective copy states of the copy groups from the first storage systems and the second storage systems and store the respective copy states of the copy groups in the copy information based on the information, so that the management system displays identification information of the certain copy group asynchronously with display concerned with change in the copy state of the certain copy group. Or in a state where copying is performed so that the copy state of the certain copy group is normal, the management system may transmit a request to either of the first storage system and the second storage system to associate one of the physical paths with the certain logical path in response to a user request to designate one of the physical paths.

According to another aspect of the invention, there is provided a remote copy management method in a management system coupled to a first storage system coupled to a computer and a second storage system, comprising:

storing information of a first copy pair formed from a first logical volume of the first storage system and a third logical volume of the second storage system and a second copy pair formed from a second logical volume of the first storage system and a fourth logical volume of the second storage system, into copy information;

storing information of a first copy group containing the first copy pair and the second copy pair into the copy information;

storing information of a first physical path formed from a first storage port of the first storage system and a third storage port of the second storage system and a second physical path formed from a second storage port of the first storage system and a fourth storage port of the second storage system, into path information;

storing information of a first logical path for specifying a certain physical path used for transferring of transfer data for remote copying of the first copy pair and transfer data for remote copying of the second copy pair based on the first physical path or/and the second physical path, into the path information;

receiving failure information concerned with the first physical path;

specifying the first logical path and the first copy group corresponding to the first physical path by referring to the copy information and the path information; and displaying identification information of the first copy group as a copy group affected by failure in the first physical path.

The remote copy management method may further have the steps of: storing the copy type of the first copy group into the copy information; and specifying whether the first copy group is synchronous remote copying or asynchronous remote copying, based on the copy information to change information displayed as the performance information based on the copy type. Or the remote copy management method may further have the steps of: receiving information concerned with the copy state of the first copy group from the first storage system and the second storage system and storing the respective copy states of the copy groups based on the information, into the copy information; and displaying identification information of the certain copy group asynchronously with display concerned with change in the copy state of the first copy group.

The remote copy management method may further have the step of transmitting a request to either of the first storage system and the second storage system to associate a third physical path with the first logical path in accordance with a user request designating the third physical path formed from a fifth storage port of the first storage system and a sixth storage port of the second storage system in a state where copying is performed while the copy state of the first copy group is normal.

The remote copy management method may further have the steps of: storing information of a third copy pair formed from a fifth logical volume of the first storage system and a sixth logical volume of the second storage system, into the copy information; storing information of a second copy group containing the third copy pair, into the copy information; storing information of a third physical path formed from a fifth storage port of the first storage system and a sixth storage port of the second storage system, into the path information; and storing information of a second logical path specifying a certain physical path used for transferring of transfer data for remote copying of the third copy pair as a third physical path, into the path information; wherein the fact that the second copy group is normal is displayed based on the copy information and the path information in the step of displaying identification information of the first copy group.

According to the invention, physical paths can be monitored easily from the viewpoint of remote copying.

BRIEF DESCRIPTION OF THE DRAWINGS

FIG. 9 is a block diagram showing the configuration of path information in Embodiment 1;

FIG. 12 is a block diagram showing the configuration of copy pair management information in Embodiment 1;

FIG. 13 is a block diagram showing the configuration of volume management information in Embodiment 1;

FIG. 18 is a screen image view for generation of path information in Embodiment 1;

FIG. 20 is a screen image view for generation of a copy information entry in Embodiment 1;

FIG. 24 is a view showing the configuration of path management information in the central management computer in Embodiment 1;

FIG. 31 is a view showing a screen image indicating failure in logical and physical paths in the central management computer in Embodiment 1;

DESCRIPTION OF THE EMBODIMENTS

Embodiments of the present invention will be described below.

Embodiment 1

1-0: Configuration of Embodiment 1

Figure 1:
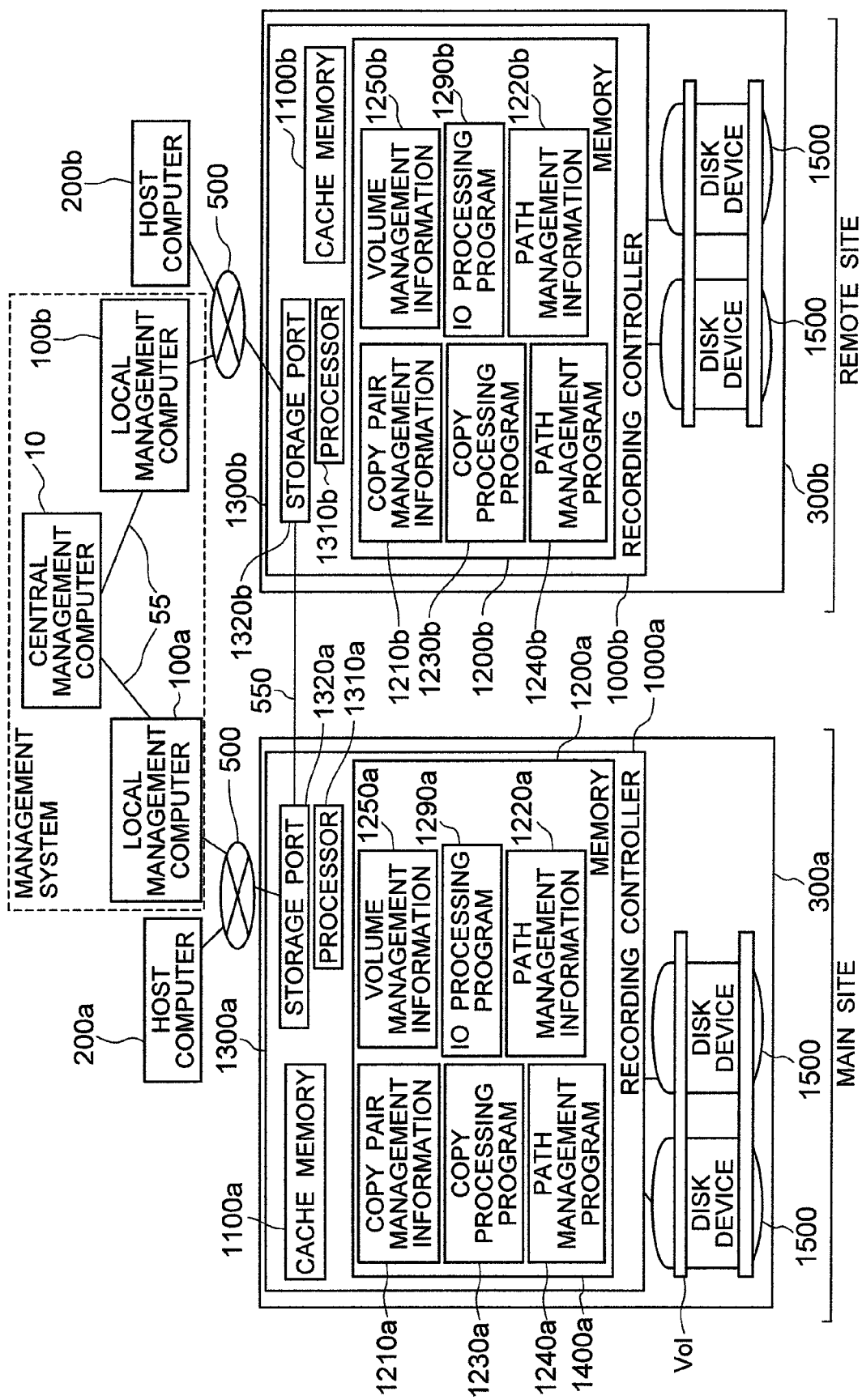
FIG. 1 is a block diagram showing the configuration of a computer system in Embodiment 1.

FIG. 1 is a block diagram showing the configuration of a computer system 1 according to Embodiment 1 of the invention.

The computer system 1 has storage systems 300 separately provided on a primary site and on a secondary site. The storage system 300 on each site is coupled to a local management computer 100 and a host computer 200. A central management computer 10 is coupled to the respective local management computers 100 on the respective sites. Although FIG. 1 expresses the local management computers, the host computers and respective constituent members of the storage systems as parts separated by sites and attended with the reference symbols a and b corresponding to the sites, particularly parts not attended with any reference symbol in this specification are common to the sites. Although FIG. 1 shows the case where one local management computer 100, one host computer 200 and one storage system 300 are provided in each site, the number of local management computers, the number of host computers and the number of storage systems are not limited.

In each site, the local management computer 100, the host computer 200 and the storage system 300 are coupled to one another through a data communication line 500.

Incidentally, the data communication line 500 may have one or more networks. The data communication line 500 may be a communication line or network used in common with either or both of a data communication line 550 and a communication line 55.

Figure 2:
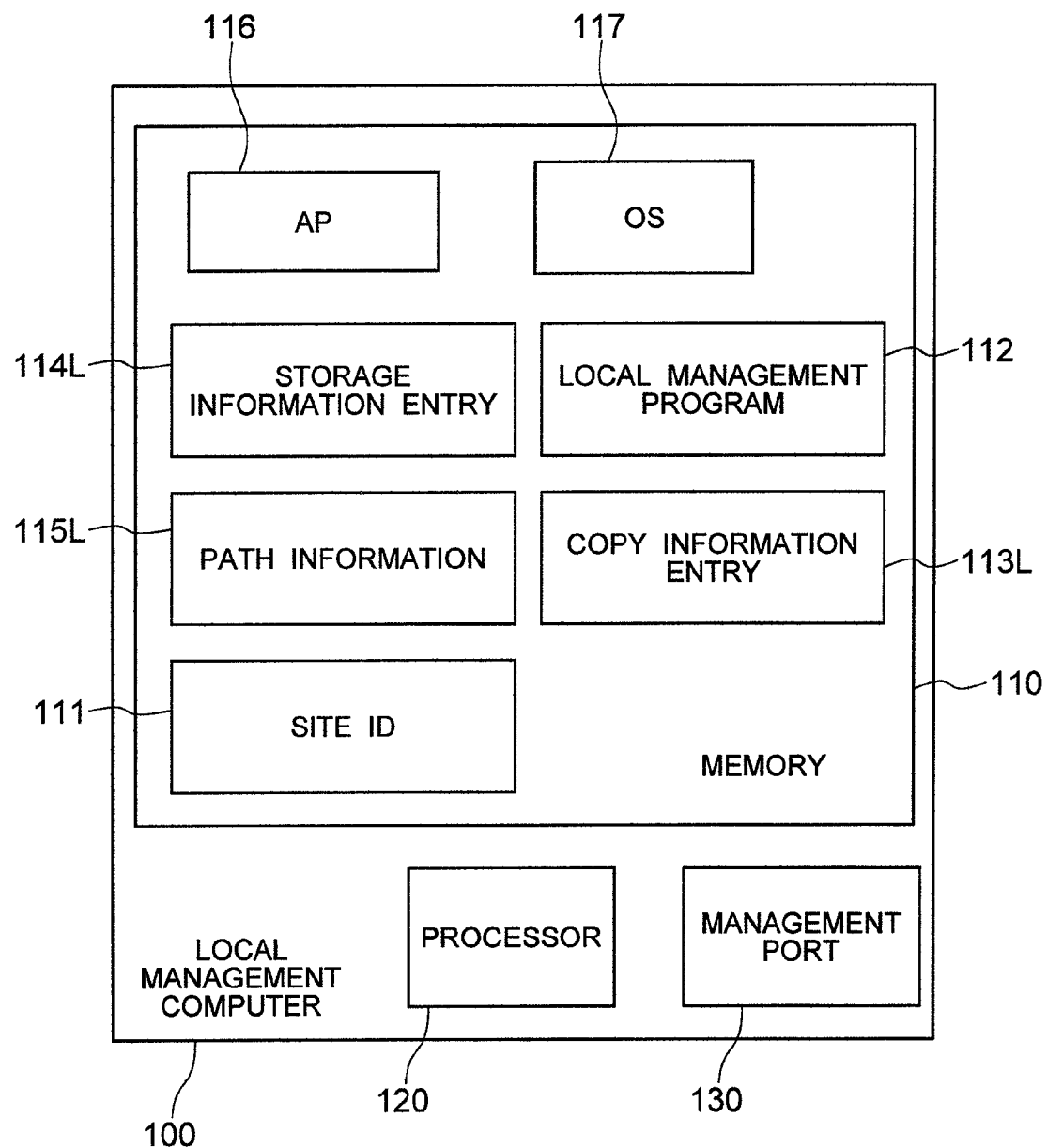
FIG. 2 is a block diagram showing the configuration of each local management computer in Embodiment 1.

FIG. 2 shows the details of each local management computer 100. Each local management computer 100 is a computer having a memory 110, a processor 120, and a management port 130. The memory 110, the processor 120 and the management port 130 are coupled to one another by an internal network (not shown). Incidentally, the local management computer may be coupled to a storage controller by using another port than a storage port.

The processor 120 performs various kinds of processing by executing programs stored in the memory 110. For example, the processor 120 transmits an IO request to a storage system 300 to thereby control remote copying to be executed by the storage system 300. Incidentally, the IO request includes a write request, a read request, a remote transfer request, a copy control request, etc. The IO request will be described in detail with reference to FIG. 14.

The memory 110 stores programs to be executed by the processor 120 and information or the like necessary for the processor 120. Specifically, the memory 110 stores a site ID 111, a local management program 112, a storage information entry 114L, a copy information entry 113L and path information 115L. The memory 110 further stores an application program (hereinafter referred to as AP) 116 and an OS (Operating System) 117. The AP 116 is a program for achieving various kinds of processing. For example, the AP 116 provides a database function or a WEB server function. The OS 117 is a program for controlling the whole of processing in the local management computer 100.

The site ID 111 is an identifier for identifying the local management computer 100. In the following description, 'ID' is used as a synonym of 'identifier'.

The local management program 112 is a program for managing the storage system 300 coupled through the data communication line 500, in accordance with a request from the central management computer 10.

The copy information entry 113L is information for managing the configuration and state of copying. Incidentally, the copy information entry 113L will be described in detail with reference to FIG. 7. In the following description, information obtained by collecting one or more copy information entries 113L corresponding to one or more storage systems 300 respectively is generically named 'local copy information' while information obtained by collecting one or more copy information entries 113C corresponding to one or more storage systems 300 respectively is generically named 'central copy information'.

The storage information entry 114L is recognition management information concerned with the storage system 300 managed by the local management computer 100. One entry per storage system 300 is generated as the storage information entry 114L. The storage information entry 114L will be described in detail with reference to FIG. 6. In the following description, information obtained by collecting one or more storage information entries 114L corresponding to one or more storage systems 300 respectively is generically named 'local storage information' while information obtained by collecting one or more storage information entries 114C corresponding to one or more storage systems 300 respectively is generically named 'central storage information'.

The path information 115L is management information for managing correspondence of a physical path 550 with logical paths constructed (set or defined) on the physical path. The physical path 550 is a communication line coupled between the storage systems 300a and 300b. The physical and logical paths will be described in detail with reference to FIG. 9.

The management port 130 is an interface coupled to the host computer 200 and the storage system 300 through the data communication line 500.

Incidentally, the local management computer 100 may have any input/output device.

Although a display, a keyboard and a pointer device are thought of as examples of the input/output device, other devices may be used. Alternatively, a serial interface or an Ethernet interface in place of the input/output device may be used as follows. A display computer having a display, a keyboard or a pointer device is connected to the interface. The interface transmits display information to the display computer to thereby display the information on the display computer. The interface receives input information from the display computer to thereby accept the input information. In this manner, the interface may perform input/display in place of the input/output device.

Figure 3:
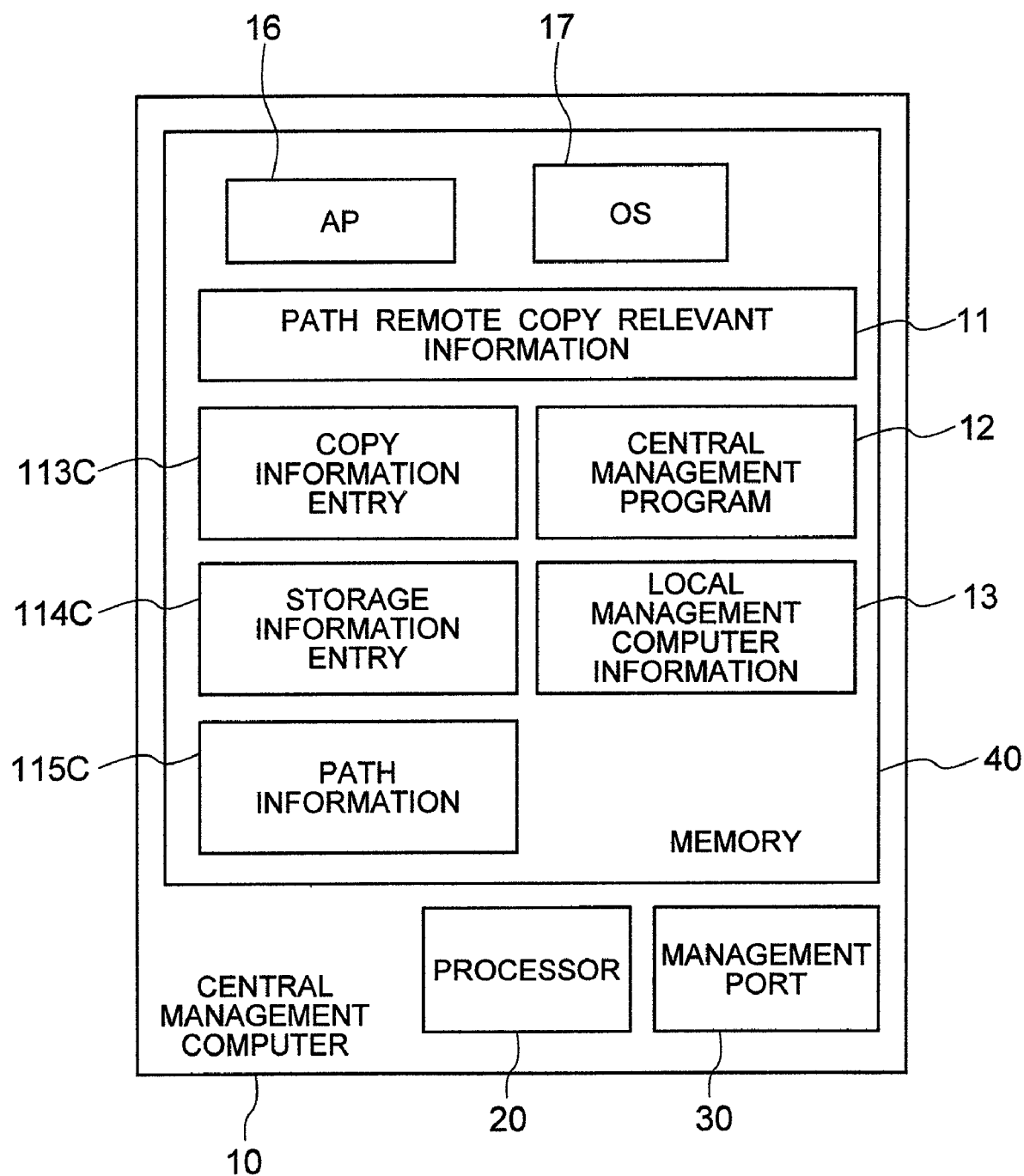
FIG. 3 is a block diagram showing the configuration of a central management computer in Embodiment 1.

FIG. 3 shows the details of the central management computer 10. The central management computer 10 is a computer having a memory 40, a processor 20, and a management port 30. The memory 40, the processor 20 and the management port 30 are coupled to one another by an internal network (not shown).

The processor 20 performs various kinds of processing by executing programs stored in the memory 40. For example, the processor 20 issues a local management request to a local management computer 100 to thereby control the local management computer 100. Incidentally, the local management request includes a table update request, a table reference request, a table deletion request, a storage control request, etc.

The memory 40 stores programs to be executed by the processor 20, information necessary for the processor 20, etc. Specifically, the memory 40 stores a central management program 12, a storage information entry 114C, a copy information entry 113C, path information 115C, path remote copy relevant information 11 and local management computer information 13. The memory 40 further stores an application program (hereinafter referred to as AP) 16 and an OS (Operating System) 17. The AP 16 is a program for achieving various kinds of processing. For example, the AP 16 provides a database function or a WEB server function. The OS 17 is a program for controlling the whole of processing in the central management computer 10.

The central management program 12 is a program for centrally controlling the storage systems 300 on plural sites (e.g. a main site and a remote site in FIG. 1) through the local management computers 100 coupled to the central management computer 10 via the communication line 55.

Incidentally, the communication line 55 may have one or more networks. The communication line 55 may be a communication line or network used in common with either or both of the data communication line 550 and the data communication line 500.

The copy information entry 113C is information for managing the configuration and state of copying. The copy information entry 113C will be described in detail with reference to FIG. 7.

The storage information entry 114C is recognition management information concerned with the storage systems 300 managed by the central management computer 10. One table per storage system 300 is generated as the storage information entry 114C. The storage information entry 114C will be described in detail with reference to FIG. 6.

The path information 115 is management information for managing correspondence of a physical path 550 with logical paths constructed on the physical path. The physical path 550 is a communication line coupled between the storage systems 300a and 300b.

The management port 30 is an interface coupled to the local management computers 100 via the communication line 55.

Incidentally, the central management computer 10 has any input/output device.

Although a display, a keyboard and a pointer device are thought of as examples of the input/output device, other devices may be used. Alternatively, a serial interface or an Ethernet interface in place of the input/output device may be used as follows. A display computer having a display, a keyboard or a pointer device is connected to the interface. The interface transmits display information to the display computer to thereby display the information on the display computer. The interface receives input information from the display computer to thereby accept the input information. In this manner, the interface may perform input/display in place of the input/output device.

Figure 4:
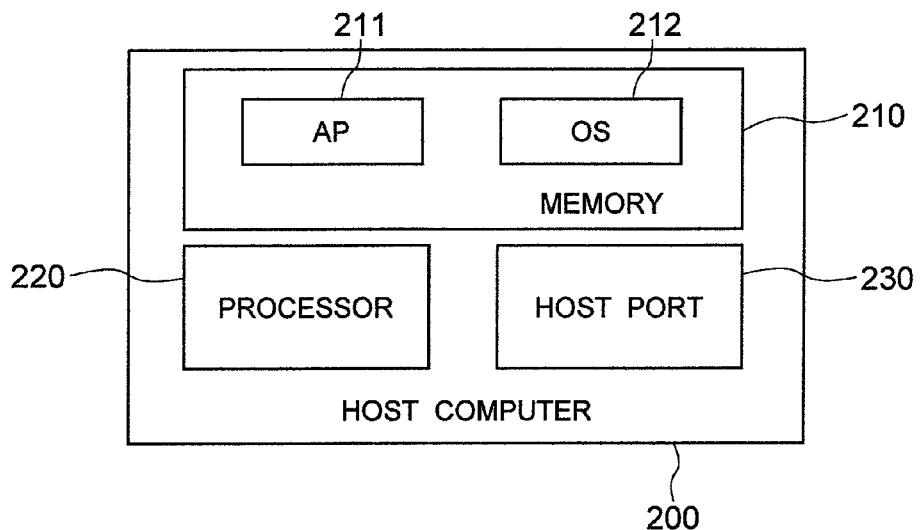
FIG. 4 is a block diagram showing the configuration of each host computer in Embodiment 1.

FIG. 4 shows the details of each host computer 200. Each host computer 200 is a computer having a memory 210, a processor 220, and a host port 230.

The memory 210, the processor 220 and the host port 230 are coupled to one another by an internal network (not shown).

The processor 220 achieves various kinds of processing by executing programs stored in the memory 210. For example, the processor 220 transmits an IO request to a storage system 300 to thereby access one or more logical volumes (hereinafter also referred to as volumes, simply) Vol provided by the storage system 300.

The memory 210 stores programs to be executed by the processor 220, information necessary for the processor 220, etc. Specifically, the memory 210 stores an AP 211 and an OS 212.

The AP 211 is a program for achieving various kinds of processing. For example, the AP 211 provides a database function or a WEB server function. The OS 212 is a program for controlling the whole of processing in the host computer 200.

The host port 230 is an interface coupled to the local management computer 100 and the storage system 300 via the data communication line 500. Specifically, the host port 230 transmits an IO request to the storage system 300.

Incidentally, the host computer 200 may have any input/output device.

Although a display, a keyboard and a pointer device are thought of as examples of the input/output device, other devices may be used. Alternatively, a serial interface or an Ethernet interface in place of the input/output device may be used as follows. A display computer having a display, a keyboard or a pointer device is connected to the interface. The interface transmits display information to the display computer to thereby display the information on the display computer. The interface receives input information from the display computer to thereby accept the input information. In this manner, the interface may perform input/display in place of the input/output device. Incidentally, the respective input/output devices in the host computer 200, the local management computer 100 and the central management computer 10 need not be the same.

Referring back to FIG. 1, the storage systems 300 will be described.

The storage system 300a and the storage system 300b are coupled to each other via the data communication line 550. Each storage system 300 has a storage controller 1000, and at least one disk device 1500.

Incidentally, the data communication line 550 may has one or more networks. The data communication line 550 may be a communication line or network used in common with either or both of the data communication line 500 and the communication line 55.

The disk device 1500 is a disk type storage medium drive which stores data write-requested from the host computer 200. Another type storage device (such as a flash memory drive) may be used in place of the disk device 1500. The storage controller 1000 controls the whole of the storage system 300. Specifically, the storage controller 1000 controls writing of data into the disk device 1500 and reading of data from the disk device 1500. The storage controller 1000 provides a storage area of the disk device 1500 as one or more logical volumes Vol to the host computer 200. Incidentally, the number of disk devices 1500 is not limited.

The storage controller 1000 has a memory 1200, a cache memory 1100 (which may be used in common with the memory 1200), a storage port 1320, and a processor 1310. Incidentally, the storage controller 1000 can be mounted if all the hardware components (such as a storage port 1320 and a processor 1310) are formed at least singly on at least one circuit board. For example, for improvement of reliability, performance, etc, the storage controller 1000 may include plural control units, each of which has a memory 1200, a storage port 1320, and a processor 1310. In addition, the storage controller may have such a hardware configuration that a cache memory 1100 is connected to the plural control units. Incidentally, the storage controller has at east one back-end port not shown but coupled to the disk device 1500. However, the storage controller 1000 may be coupled to the disk device by hardware other than the back-end port.

The cache memory 1100 temporarily stores data to be written into the disk device 1500 and data to be read from the disk device 1500.

The storage port 1320 is an interface coupled to the local management computer 100, the host computer 200 and the other storage system 300 through the data communication line 500. Specifically, the storage port 1320 receives an IO request from the local management computer 100 or the host computer 200. The storage port 1320 transmits data read from the disk device 1500 to the local management computer 100 or the host computer 200. In addition, the storage port 1320 transmits/receives data exchanged between the storage systems 300.

The processor 1310 performs various kinds of processing by executing programs stored in the memory 1200. Specifically, the processor 1310 processes an IO request received by the storage port 1320. The processor 1310 controls writing of data into the disk device 1500 and reading of data from the disk device 1500. The processor 1310 sets logical volumes Vol based on a storage area of one or more disk devices 1500 by processing programs as follows.

The memory 1200 stores programs to be executed by the processor 1310, information necessary for the processor 1310, etc. Specifically, the memory 1200 stores copy pair management information 1210, path management information 1220, a copy processing program 1230, a path management program 1240, volume management information 1250 and an IO processing program 1290.

Although the hardware configuration of each storage system 300 has been described, the storage system 300a and the storage system 300b need not have the same hardware configuration.

The programs and information stored in the memory 1200 will be described below.

The copy pair management information 1210 is information for managing a copy pair. The copy pair is a pair of logical volumes Vol on the storage system 300 as a subject of copying. The copy pair management information 1210 will be described in detail with reference to FIG. 12.

The copy processing program 1230 performs copy processing (initial copying and steady-state copying). The copy processing will be described in detail with reference to FIGS. 27 and 29.

The path management program 1240 performs path management (construction of logical paths and deletion of logical paths). The path management will be described in detail with reference to FIG. 22.

The IO processing program 1290 processes an IO request received by the storage port 1320.

The path management information 1220 is management information for managing correspondence of a physical path 550 with logical paths constructed on the physical path. The physical path 550 is a communication line (or network) coupled between the storage systems 300a and 300b. The path management information will be described in detail with reference to FIG. 24.

The volume management information 1250 is information for managing logical volumes Vol provided by the storage system 300. The volume management information 1250 will be described in detail with reference to FIG. 12.

In the following description, when the central management computer 10 controls a storage system 300, the central management computer 10 issues a control request to a local management computer 100. When the storage system is on a site managed by the local management computer 100, the local management computer 100 issues a storage control request 7300 to the storage system. As described above, in this embodiment, the storage systems are controlled on the assumption that the central management computer takes charge of general processing of the computer system while the local management computers take charge of processing on respective sites. Consequently, in the computer system according to this embodiment, the processing load imposed on the whole system can be distributed so that efficient storage system controlling can be achieved.

However, the storage systems 300 (or the communication line 550) need not be managed by the three management computers (the central management computer 10 and the local management computers 100a and 100b). The central management computer 10 and the local management computers 100a and 100b may be integrated into one management computer or the central management computer 10 may be integrated with either or both of the local management computers 100a and 100b. Alternatively, part or all of these management computers may be integrated with the host computer.

Incidentally, the configuration of the management computer or system, programs, information and contents of processing after the integration can be achieved when this specification is read so that the integrated management computer has programs and information of the original management computers and coupling relationships of the original management computers with other devices and systems, and that processing performed by the original computers based on the programs is performed by the integrated computer. Incidentally, contents contained in part of information (such as the storage information entries 114L and 114C, the path information 115L and 115C and the copy information entries 113L and 113C) may be duplicative because of the integration. In such a case, the duplicate contents may be deleted from respective information.

In the following description, a computer system, a computer or a set of computers for managing storage systems 300 may be referred to as 'management system'. In this specification, a system including storage systems 300 and a management system may be referred to as 'data storage system'.

According to the aforementioned configuration, while write data transmitted by the host computer 200a is stored in logical volumes of the storage system 300a (primary storage system) on the main site, the write data is transferred to the storage system 300b (secondary storage system) on the remote site by synchronous remote copying or asynchronous remote copying so that the transferred write data is stored in logical volumes of the secondary storage system. Accordingly, data which is stored in the logical volumes of the primary storage system and which is as a subject of data duplexing can be made redundant. Consequently, even when data in the logical volumes of the primary storage system disappears, copied data stored in the logical volumes of the secondary storage system can be used so that a certain process can be resumed by the host computer 200b.

1-1: Description of Physical and Logical Paths

Figure 5:
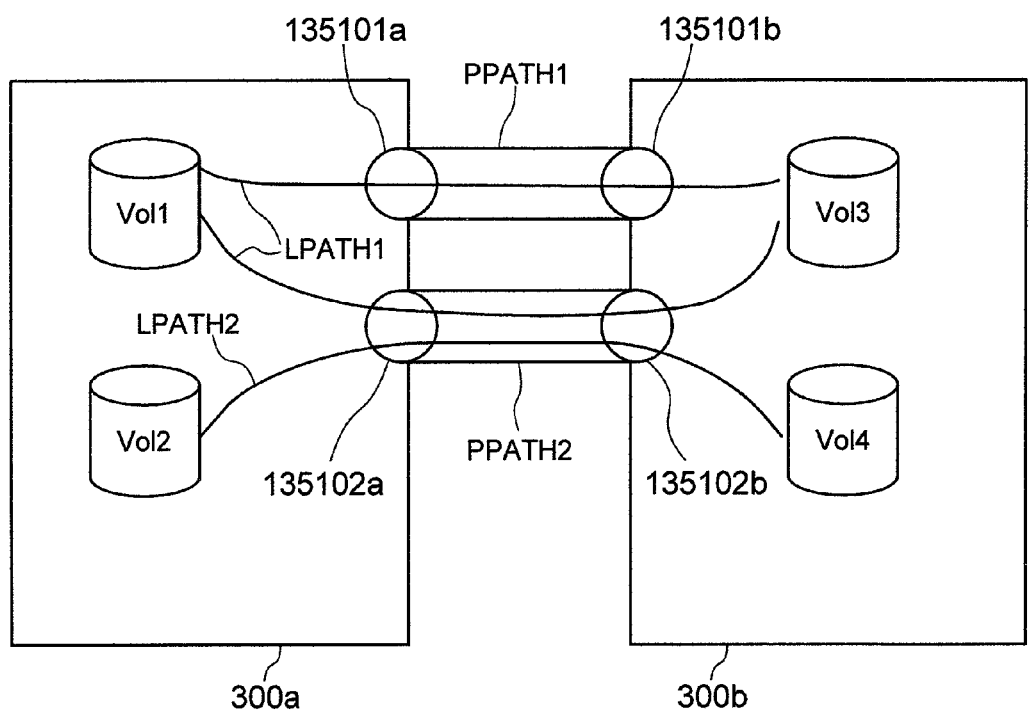
FIG. 5 is a block diagram showing logical paths and physical paths in Embodiment 1.

The physical and logical paths will be described with reference to FIG. 5.

'Physical path' is a communication line (or network) coupled between two different storage systems. In the storage systems, 'physical path' is controlled based on a combination of storage ports 1320a and 1320b (a combination of storage ports 135101a and 135101b and a combination of storage ports 135102a and 1351012b in FIG. 5) which are coupling ports of the communication line between the storage systems. For example, in FIG. 5, there are two physical paths PPATH1 and PPATH2. PPATH1 is controlled based on a combination of ports 135101a and 135101b while PPATH2 is controlled based on ports 135102a and 135102b.

'Logical path' is a logical communication line (or network) constructed (defined or set) by use of the physical path coupled between two different storage systems. A storage system 300 manages and uses 'logical path' based on a combination of logical volumes or logical volume sets or based on a copy pair or a set of copy pairs between the storage system and a destination storage system coupled. For example, in FIG. 5, the storage system 300a manages a logical path LPATH2 so that the logical path LPATH2 is associated with a volume Vol2 as a coupling source and a volume Vol4 of the storage system 300b as a coupling destination. Data written into the logical volume Vol2 of the storage system 300a is transferred to the logical volume Vol4 of the storage system 300b via LPATH2. Data written into Vol1 of the storage system 300a is transferred via two logical paths LPATH1. In this manner, plural logical paths can be constructed on one physical path. In this case, write data via plural logical paths are mixed on a physical path associated with the plural logical paths.

On the other hand, one logical path may be constructed for plural physical paths in such a manner that one logical path of the same identifier as represented by LPATH1 is constructed on physical paths PPATH1 and PPATH2. Incidentally, when one logical path is constructed based on plural physical paths, data written into the same logical volume is transferred while distributed into plural logical paths. Further, when logical paths of different identifiers such as LPATH1 and LPATH2 are constructed, data written into the different logical volumes may be transferred independently via corresponding logical paths.

As described above, a copy pair (or a set of copy pairs) is associated with a logical path. For example, reasons are as follows.

(Reason 1) This is because setting work for each copy pair can be reduced (or eliminated) when change of physical paths occurs in accordance with increase and decrease in number of storage ports. Because the number of copy pairs is often larger than the number of physical paths, reduction in quantity of setting work based on introduction of logical paths is large.

(Reason 2) This is because setting can be made easily for parallel transfer using plural physical paths or when one physical path is used in common to plural copy pairs.

1-2: Outline of the Embodiment

The outline of this specification will be described below. Incidentally, it does not mean that items not described in the following outline are quit claimed.

The achievement of remote copying by the storage systems permits reduction of the copy load imposed on the host computers but the management computer or each host computer needs to monitor or operate remote copying. Therefore, each storage system holds information of a copy state (e.g. a state where copying is normally operated (pair state which will be described later), a state where initial copying is being executed (copying state which will be described later) or a state where copying is suspended for some reason (suspended state or abnormal state which will be described later)) of each copy pair, and transmits the copy state to any one of the local management computer, the central management computer and the host computer.

Any one of the local management computer, the central management computer and the host computer presents the copy state to a user so that the user can monitor whether remote copying is performed normally. For example, when the copy state of a certain copy pair is abnormal, the user can judge that remote copying is not operated for some reason (e.g. failure or mistaken setting in the storage systems 300 or failure or mistaken setting in the communication line 550).

Either synchronous remote copying or asynchronous remote copying, however, has a possibility that the user cannot rapidly judge a copy pair affected by failure in the communication line 550 because the copy state may not be changed immediately for some reason after occurrence of failure in the communication line 550.

(Case of Synchronous Remote Copying)

Synchronous remote copying is performed as follows. Upon reception of a write request from the host computer, the storage system 300a sends write data attendant on the write request to the storage system 300b. Upon reception of the write data, the storage system 300b writes (or stores) the data into the cache memory 1100b and the logical volume and then sends back a response. Upon reception of the response, the storage system 300a sends back a notice indicating the completion of the write request to the host computer. In this manner, after write data is stored in the storage systems 300a and 300b, the host computer sends a notice indicating the completion of the write request to the storage system 300a.

The state of the copy pair in synchronous remote copying changes from a pair state to an abnormal state when transfer of write data from the storage system 300a to the storage system 300b is not completed normally in a certain time. For this reason, there is a possibility that failure in the communication line 550 cannot be detected in accordance with the type of the failure while the storage system 300a has not received the write request yet.

(Case of Asynchronous Remote Copying)

Asynchronous remote copying is performed as follows. Upon reception of a write request from the host computer, the storage system 300a stores write data corresponding to the write request in the cache memory 1100a and the logical volume or memory of the storage system 300a and then sends a completion notice to the host computer. After the transmission of the completion notice or in timing asynchronous with the completion notice, the storage system 300a sends the write data attendant on the write request to the storage system 300b. Upon reception of the write data, the storage system 300b writes the data into the cache memory 1100b and the logical volume.

The state of the copy pair in asynchronous remote copying also changes from a pair state to an abnormal state when failure occurs in data transfer of write data from the storage system 300a to the storage system 300b. In asynchronous remote copying, the change of the state however occurs asynchronously with the write request because the transfer process occurs asynchronously with the write request from the host computer.

The timing of the state change varies according to the method for achieving asynchronous remote copying but, for example, there are the following cases.

(Case 1) Heartbeat communication is performed periodically between the storage systems during a pair state of the copy pair. When the heartbeat communication cannot be performed for a certain time, the aforementioned state change is performed. Incidentally, the case may be applied to synchronous remote copying.

(Case 2) The aforementioned state change is performed when the untransferable quantity of write data as a subject of the transfer (or the quantity of data written into the copy destination volume) exceeds a certain capacity.

As another example that the user cannot rapidly judge the copy pair affected by failure in the communication line 550, there is the case where performance of the communication line may be lowered according to the failure type in either synchronous remote copying or asynchronous remote copying. This is because remote copying is continued on this occasion though there is a possibility that performance may be lowered.

Incidentally, if the abnormal state of the copy pair is changed to an initial copying state in order to restart remote copying for the copy pair, consistency of the copy destination logical volume is unwarranted by initial copying during the initial copying state. Therefore, the restart of the remote copying is performed based on a request given to the storage systems 300. It is said that it is preferable from the viewpoint of data disappearance that the copy pair is in a pair state for failure which can be recovered in a short time.

Examples of failure in the communication line 550 are as follows.

(Example 1) Failure such as physical breakage or damage of a cable between storage systems.

(Example 2) Failure in a communication apparatus such as a fibre channel switch, a channel extender or a router forming a network when the communication line 550 is the network.

(Example 3) A more specific example than Examples 1 and 2. There is the case where the network from the storage system 300a to the storage system 300b includes a main site network, a wide area network, a remote site network, a first communication apparatus for mediating communication between the main site network and the wide area network, and a second communication apparatus for mediating communication between the remote site network and the wide area network. Communication failure based on failure in any one of the first communication apparatus, the second communication apparatus and the wide area network in this case.

In this embodiment, the following processes are performed in the management system (e.g. including the local management computers 100 and the central management computer 10) to rapidly specify the copy pair affected by failure in a physical path.

(Process 1) Information of correspondence of logical paths to physical paths (path information 115) is stored.

(Process 2) Information of correspondence of copy pairs to logical paths (path remote copy relevant information) is stored.

(Process 3) Information of failure concerned with a certain physical path is received.

(Process 4) At least one copy pair corresponding to the failed physical path is specified by referring to the information of correspondence of logical paths to physical paths and the information of correspondence of copy pairs to logical paths, and information of the specified copy pair is displayed.

If remote copying is operated with a set of copy pairs (i.e. copy group which will be described later) as a unit, information of correspondence of copy pairs to copy groups may be stored in advance so that a copy group is specified by referring to the correspondence information to thereby display information concerned with the specified copy group.

Copy pairs corresponding to a copy group may be a group concerned with a write sequence from the host computer. The copy group may be a group which warrants consistency of copy pairs included in the group over sub-volumes. Incidentally, 'consistency' is a concept concerned with a sequence of data written into volumes. Consistency is regarded as valid when the following condition is satisfied.

Consistency: When the host computer is to write first data A and next data B into a volume while the write sequence of data is kept constant, the host computer permits part or all of the data B to be stored in the volume only when all of the data A has been already stored in the volume with respect to the data A and the data B in the case where the data B is written after confirmation of reception of the write completion of the data A from the storage system.

Incidentally, it is preferable that the display process provided as the process 4 can be executed asynchronously with the state display process concerned with copying for the copy pair (or copy group).

Although ID of the copy pair or copy group is conceivable as the information of the copy pair or copy group which has been described above, information of performance of remote copying may be included. For example, in synchronous remote copying, the time (so called response time) required for sending a response to the host computer after reception of a write request may be included. In asynchronous remote copying, the transfer band between the storage systems 300 (which may be based on a result obtained by write data transfer from the storage system 300a to the storage system 300b or a result obtained by test communication) may be included. Although it is thought of that these pieces of performance information are values measured by the storage systems 300 and received by the management system, these pieces of performance information may be values measured by computers or devices other than the storage systems 300 and received by the management system.

After failure in the physical path, there is a possibility that transfer performance (mainly including transfer band but including round trip time) will change when plural physical paths are used for transferring write data. Even when each physical path is used individually, the route of the wide area network may be switched to another route by the communication apparatus forming the physical path. Also in this case, transfer performance (both transfer band and round trip time) may change. Therefore, the confirmation of the performance information makes it possible to check whether remote copying after failure is performed with assumed performance.

1-3: Storage Information Entry

Figure 6:
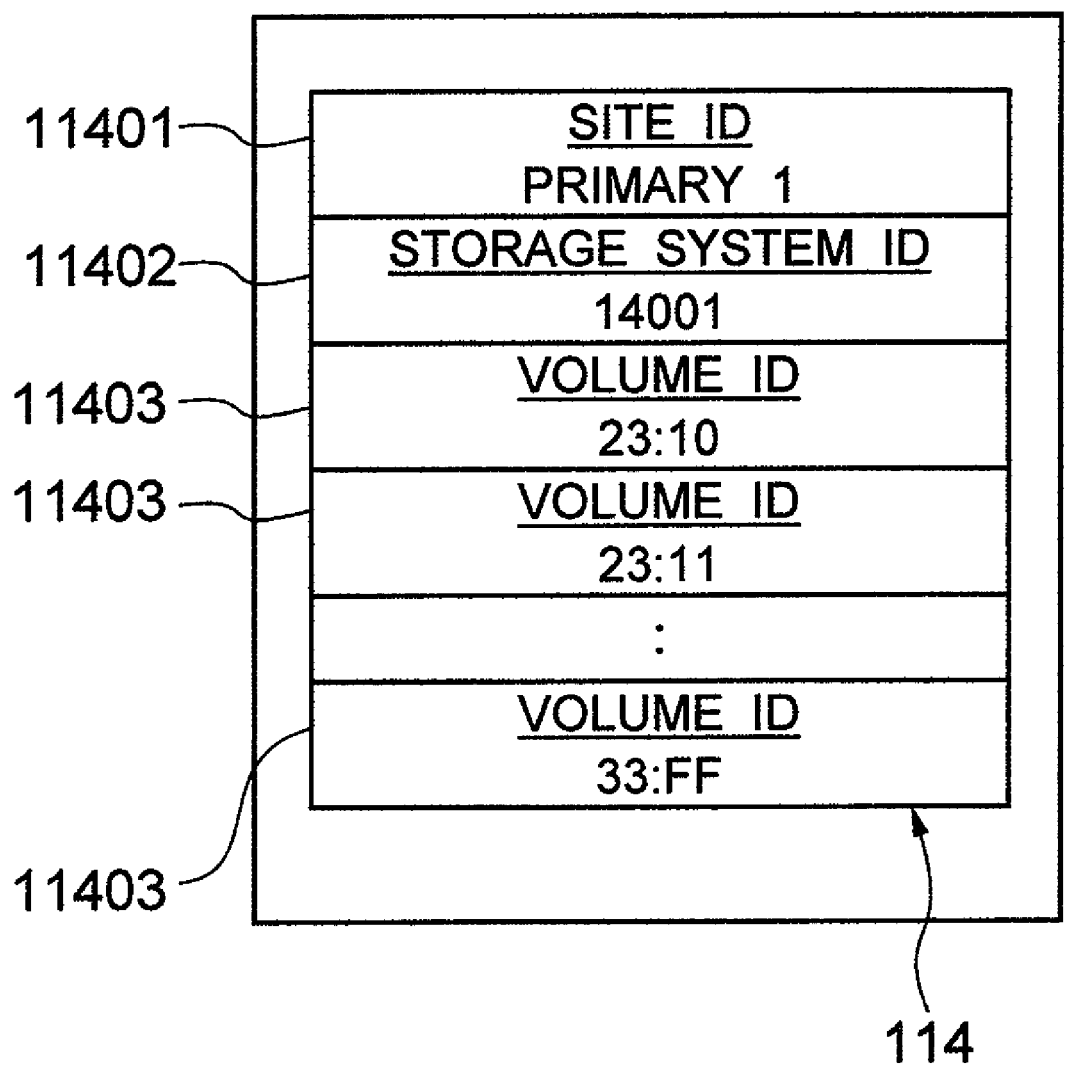
FIG. 6 is a block diagram showing the configuration of a storage information entry in Embodiment 1.

FIG. 6 is a view showing an example of configuration of a storage information entry 114C stored in the central management computer 10. Incidentally, the storage information entry 114C is a table which is created by each local management computer 100 based on information acquired from each storage system. A process of creating the table will be described later. The storage information entry 114C is a table indicating information of logic volumes Vol recognized by the local management computer 100. The storage information entry 114C includes a site ID 11401, a storage system ID 11402, and logical volume IDs 11403.

The site ID 11401 is an identifier (ID) which is provided for identifying a site given to the local management computer 100 and which indicates the storage information entry 114C acquired by the local management computer 100. For example, all storage information entries 114C of storage systems 300 allowed to be directly accessed by the local management computer 100 have the same site ID.

The storage system ID 11402 is an identifier of each storage system 300 managed by the central management computer 10 and the local management computer 100.

The logical volume ID 11403 is an identifier of each logical volume Vol added in the device and managed by the storage system 300 so as to be used in an internal process in the storage system 300 identified by the storage system ID 11402. In FIG. 6, information such as 23:10 is stored.

Although the storage information entry 114C has been described as information having a table structure, the storage information entry 114C may have a data structure other than the table structure if storage systems 300 on each site and volumes of the storage systems 300 can be specified.

The aforementioned central storage information entry obtained by collecting plural storage information entries 114C may have any data structure if storage systems corresponding to each site and volumes of the storage systems can be specified.

Although it can be thought of that the storage information entry 114L of the local management computer 100 has the same configuration as that of the storage information entry 114C, the storage information entry 114L need not store the same data as the storage information entry 114C and may have a data structure other than the table structure if storage systems 300 on each site and volumes of the storage systems 300 can be specified. The aforementioned local storage information entry obtained by collecting plural storage information entries 114L may have any data structure if storage systems on each site and volumes of the storage systems can be specified.

1-4: Copy Information Entry

Figure 7:
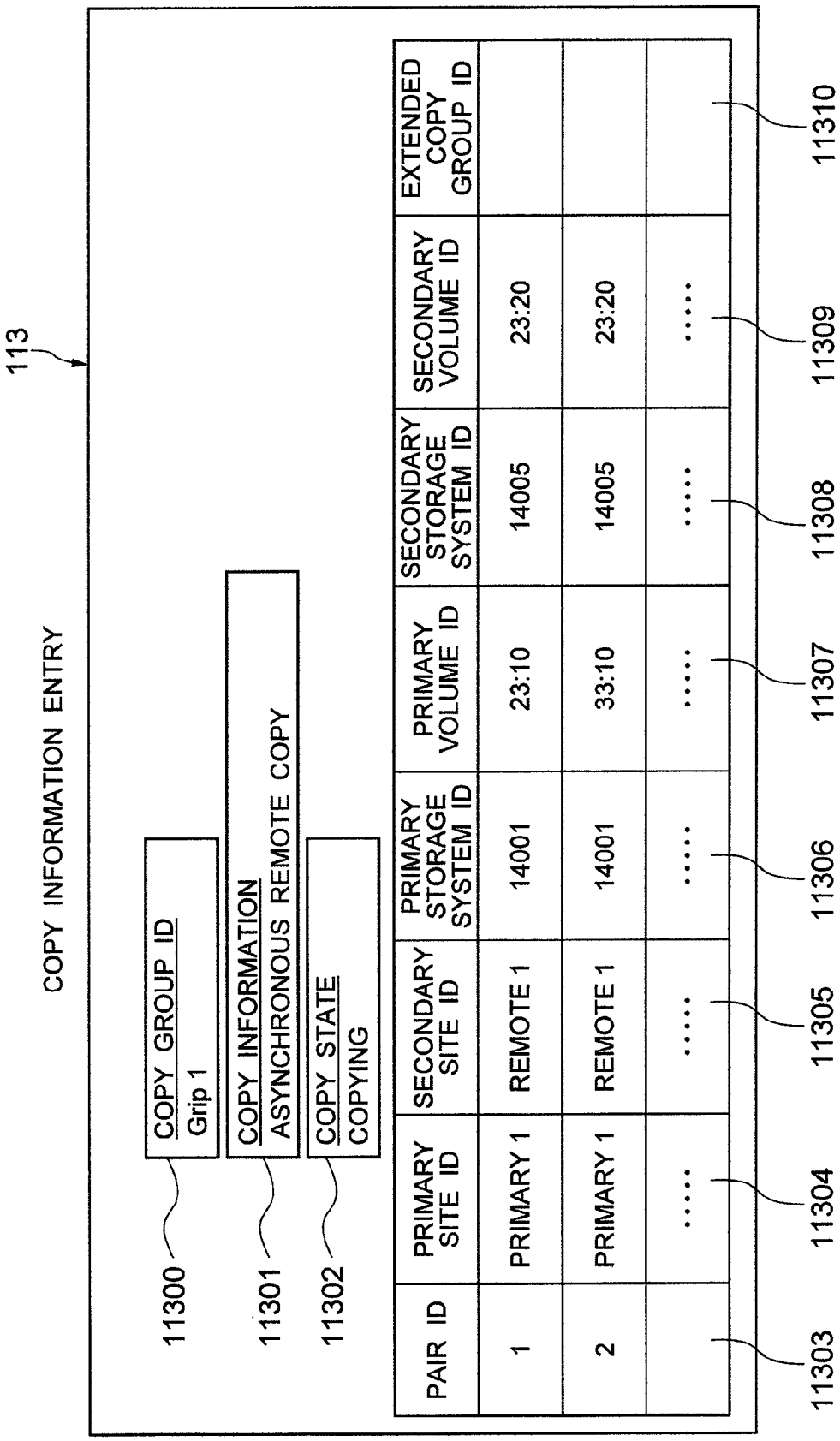
FIG. 7 is a block diagram showing the configuration of a copy information entry in Embodiment 1.

FIG. 7 is a view showing an example of configuration of a copy information entry 113C stored in the central management computer 100. Incidentally, the copy information entry 113C is a table which is created by the central management computer 10 after the central management computer 10 acquires a storage information entry table 113A of the main site and a storage information entry table 113B of the remote site from the local management computers respectively. The copy information entry 113C will be described in detail later.

The copy information entry 113C is a table which is created whenever the central management computer 10 issues a copy request. A copy group ID (copy group identifier) is given in the table according to the request. The copy group is a set of copy pairs.

The copy information entry 113C includes a copy group ID 11300, a copy information entry 11301, a copy state 11302, and copy configuration information 11303 to 11310.

The copy group ID 11300 is an identifier for managing plural copy pairs collectively as a group.

The copy information entry 11301 includes a copy type, and copy option information. The copy type indicates whether remote copying as a function provided by the storage systems 300 is synchronous remote copying or asynchronous remote copying. Remote copying is copying performed between different storage systems 300. In this case, a copy source logical volume Vol and a copy destination logical volume Vol are in separated storage systems 300a and 300b respectively. Synchronous remote copying is remote copying in which copying for making the contents of the copy destination logical volume match with the contents of the copy source logical volume is synchronous with data writing by the host computer. Asynchronous remote copying is remote copying in which copying for making the contents of the copy destination logical volume match with the contents of the copy source logical volume is asynchronous with data writing by the host computer.

The copy option information is information indicating an option provided by each copy type. For example, the option information indicates whether or not data is enabled to be written into the copy destination logical volume at the time of suspension of remote copying. Suspension of remote copying means suspension of remote copying based on a request from the central management system 10.

The copy state information 11302 indicates a current state of copying managed based on the copy information entry 113. Specifically, for example, the copy state information 11302 indicates which of 'not copied', 'copying', 'suspending', 'pair' and 'abnormal' is the state of copying managed based on the copy information entry 113.

The copy configuration information includes a pair ID 11303, a primary site ID 11304, a secondary site ID 11305, a primary storage system ID 11306, a volume ID 11307, a secondary storage system ID 11308, and a secondary volume ID 11309.

The pair ID 11303 is an identifier which is given to a pair by the central management computer 10.

The primary site ID 11304 is an identifier which is processed as a copy source logical volume Vol (hereinafter referred to as primary volume) by the local management computer 100a. The site ID 11401 in the storage information entry 114 is registered in the primary site ID 11304.

The secondary site ID 11305 is an identifier which is processed as a copy destination logical volume Vol (hereinafter referred to as secondary volume) by the local management computer 100b. The site ID 11401 in the storage information entry 114 is registered in the secondary site ID 11305.

The primary storage system ID 11306 is an identifier of the storage system (hereinafter referred to as primary storage system) 300a on the copy source site (hereinafter referred to as primary site) providing the primary volume. The primary storage system 300a stores data from the local management computer 100a and the host computer 200a.

The primary volume ID 11307 is an identifier of the primary volume which is given for management in the device by the primary storage system 300a.

The secondary storage system ID 11308 is an identifier of the storage system 300b (hereinafter referred to as secondary storage system) on the copy destination site (hereinafter referred to as secondary site) providing the copy destination secondary volume.

The secondary volume 11309 is an identifier of the secondary volume which is given for management in the device by the secondary storage system 300b.

An extended copy group ID 11310 is an identifier of an extended group which is used when copy group IDs are managed collectively as a group.

Although the copy information entry 113C has been described as information having a table structure, the copy information entry 113C may have a data structure other than the table structure if it has correspondence of a copy group to at least one copy pair, the copy state of the copy group (or copy pair) or correspondence of a copy pair to volumes of the storage systems 300.

Further, information obtained by collecting plural copy information entries 113C may be treated as a central copy information entry. Also in this case, the central copy information entry may have a data structure other than the table structure if it has correspondence of a copy group to at least one copy pair, the copy state of the copy group (or copy pair) or correspondence of a copy pair to volumes of the storage systems 300.

Although it can be thought of that the copy information entry 113L stored in the local management computer 100 has the same configuration as that of the copy information entry 113C, the same data as the copy information entry 113C need not be stored in the copy information entry 113L. The copy information entry 113L may have a data structure other than the table structure if it has correspondence of a copy group to at least one copy pair, the copy state of the copy group (or copy pair) or correspondence of a copy pair to volumes of the storage systems 300. Information obtained by collecting plural copy information entries 113L may be treated as a local copy information entry. Also in this case, the local copy information entry may have a data structure other than the table structure if it has correspondence of a copy group to at least one copy pair, the copy state of the copy group (or copy pair) or correspondence of a copy pair to volumes of the storage systems 300.

1-5: Site ID

Figure 8:
FIG. 8 is a block diagram showing the configuration of a site ID in Embodiment 1.

FIG. 8 is a configuration view of a site ID 111 stored in each local management computer 100. An identifier of the local management computer 100 is stored in the site ID table 111.

1-6: Path Information

FIG. 9 is a view showing an example of configuration of path information 115C stored in the central local management computer 10. The path information 115C has two kinds of information sets, that is, a logical path information set (11501 to 11507) and a physical path information set (11510 to 11514).

The logical path information set includes a logical path ID 11501, a path type 11502, a primary storage system ID 11503, a primary representative volume 11504, a secondary storage system ID 11505, a secondary representative volume 11506, and a relevant physical path ID 11507.

The logical path ID 11501 is an identifier of a logical path which is given for management in the storage system.

The path type 11502 indicates the type of the logical path. A volume path, a volume set path or a storage path is used as the logical path. In the volume path, data in a specific logical volume in the storage system is subject to transfer. In the volume set path, logical volumes in the storage system are subject to transfer. For example, in the volume set path, all data in logical volumes having volume IDs of the same upper 2 digits are subject to transfer so that the storage system transfers the data to the coupling destination storage system (as referred to as CU in FIG. 9). In the storage path, data in all logical volumes in the storage system are subject to transfer.

The primary storage system ID 11503 is an identifier of the primary storage system 300a.

The primary representative volume 11504 is an identifier of the logical volume which is subject to transfer in the logical path.

The secondary storage system ID 11505 is an identifier of the secondary storage system 300*b*.

The secondary representative volume 11506 is an identifier of the logical volume which is subject to reception in the logical path.

The relevant physical path ID 11507 is an identifier of at least one physical path used by the logical path. Identifiers of plural physical paths may be registered in the relevant physical path ID.

The physical path information set includes a physical path ID 11511, a primary storage system ID 11512, a primary port ID 11513, a secondary storage system ID 11514, a secondary port ID 11515, and a path state 11516.

The physical path ID 11511 is an identifier of a physical path which is given for management in the storage system.

The primary storage system ID 11512 is an identifier of the primary storage system 300*a*.

The primary port ID 11513 is an identifier of ports provided in the primary storage system 300*a*.

The secondary storage system ID 11514 is an identifier of the secondary storage system 300*b*.

The secondary port ID 11515 is an identifier of ports provided in the secondary storage system 300*b*.

The path state 11516 indicates the state of the physical path.

Although the path information 115C has been described as information having a table structure, the path information 115C may have a data structure other than the table structure if it has correspondence of the physical path to storage ports of the storage system, the state of the physical path, correspondence of the physical path to logical paths or correspondence of the logical paths to volumes of the storage system.

Although it can be thought of that path information 115L stored in the local management computer 100 has the same configuration as that of the path information 115C, the same data as the path information 115C need not be stored in the path information 115L. The path information 115L may have a data structure other than the table structure if it has correspondence of the physical path to storage ports of the storage system, the state of the physical path, correspondence of the physical path to logical paths or correspondence of the logical paths to volumes of the storage system.

1-7: Local Management Computer Information

Figure 11:
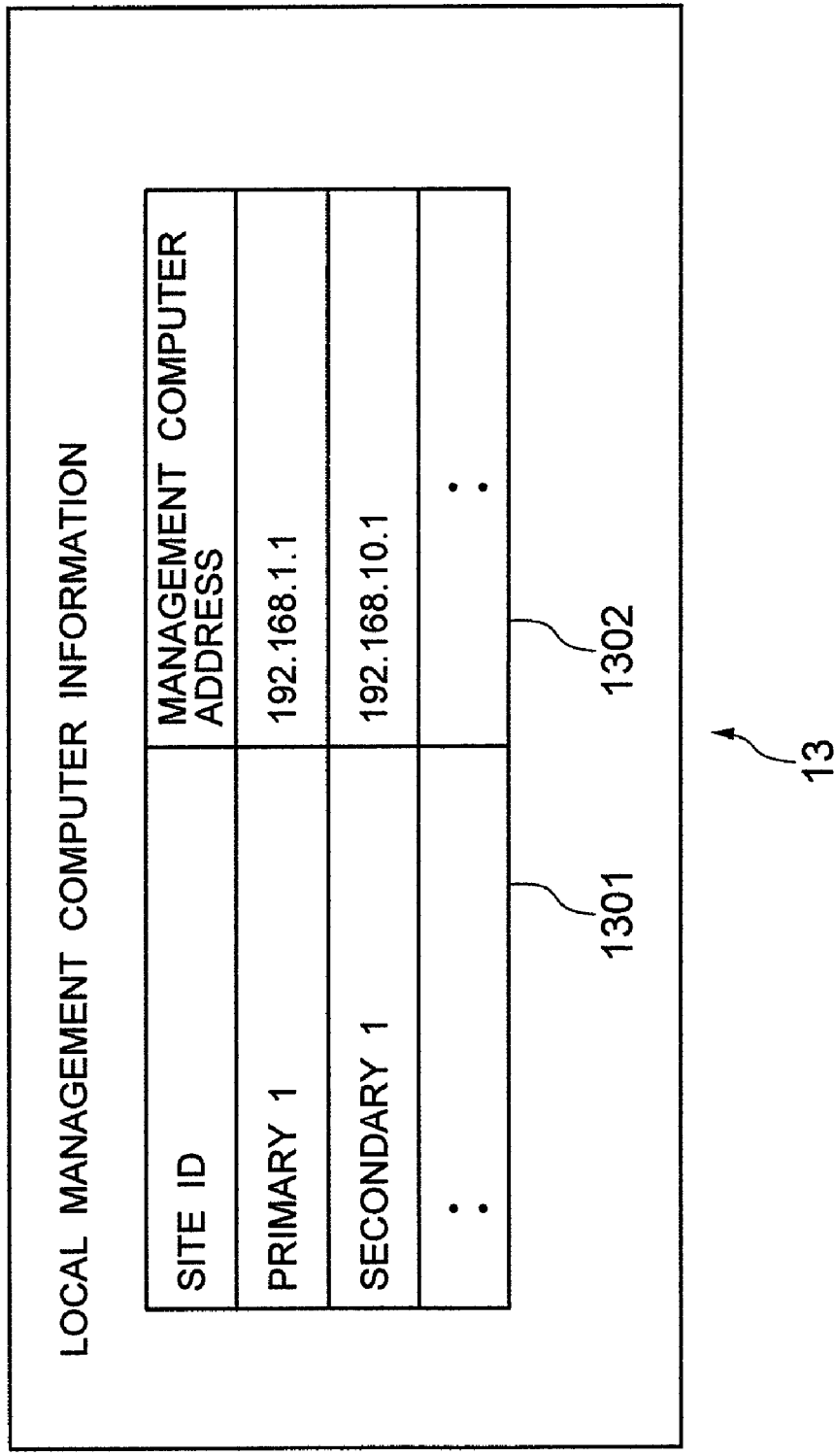
FIG. 11 is a block diagram showing the configuration of local management computer information in Embodiment 1.

FIG. 11 is a view showing an example of configuration of local management computer information 13 stored in the memory 40 of the central management computer 10. The local management computer information 13 includes a site ID 1301, and a management computer address 1302.

The site ID 1301 is an identifier for identifying each local management computer 100.

The address 1302 is a network address of the local management computer 100.

Incidentally, the local management computer information 13 may have a data structure other than the table structure if it has an identifier of communication between the central management computer 10 and each local management computer 100.

1-8: Path Remote Copy Relevant Information

Figure 10:
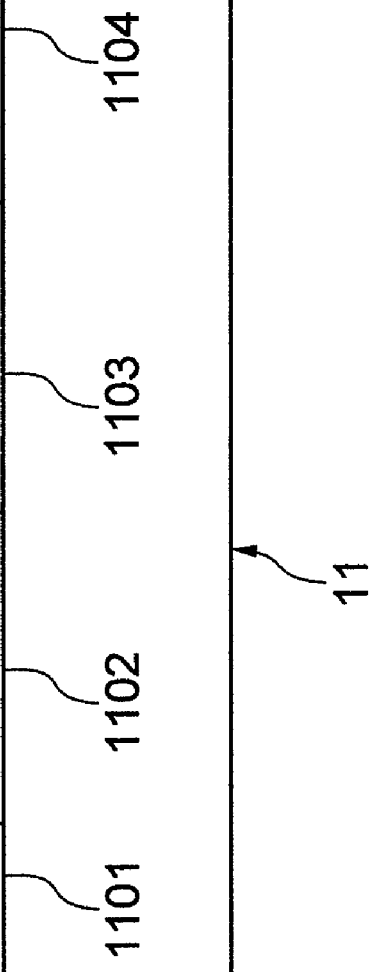
FIG. 10 is a block diagram showing the configuration of path remote copy relevant information in Embodiment 1.

FIG. 10 is a view showing an example of configuration of path remote copy relevant information 11 stored in the memory 40 of the central management computer 10. The path remote copy relevant information 11 includes a logical path ID 1101, a physical path ID 1102, a copy group ID 1103, and additional information 1104.

The logical path ID 1101 is an identifier of a logical path which is given for management in the storage system.

The physical path ID 1102 is an identifier of a physical path which is given for management in the storage system.

The copy group ID 1103 is an identifier based on which the central management computer 10 and each local management computer 100 manage copy pairs collectively as a group.

The additional information 1104 is information added to the copy group ID 1103. An extended copy group ID based on which copy groups are managed further collectively as an upper group is registered in the additional information 1104. Further, when second remote copying follows first remote copying though the copy destination logical volume, second remote copy is registered in the additional information 1104.

Although the path remote copy relevant information 11 has been described as information having a table structure, the path remote copy relevant information 11 may have a data structure other than the table structure if it has correspondence of logical paths to copy groups or correspondence of logical paths to physical paths.

1-9: Copy Pair Management Information

FIG. 12 is a view showing an example of configuration of copy pair management information 1210 stored in each storage system 300 in Embodiment 1 of the invention.

The copy pair management information 1210 includes a copy group ID 12100, a copy pair ID 12101, a volume ID 12102, copy state information 12103, a copy target storage system ID 12104, a copy target volume ID 12105, and a copy type 12106.

The copy group ID 12100 is an identifier of a copy group to which a copy pair identified by the copy pair ID 12101 belongs. The storage system 300 manages a copy group including at least one copy pair. Therefore, the management computer 100 can designate a copy group to request copy pairs included in the group collectively to suspend, resume or cancel the remote copying operation.

The copy pair ID 12101 is an identifier of a copy pair including a logical volume Vol identified by the logical volume ID 12102 and a logical volume Vol identified by the copy target volume ID 12105. Specifically, the pair ID 11303 in the aforementioned copy information entry 113 is registered in the copy pair ID 12101.

The volume ID 12102 is an identifier of a logical volume provided by the storage system 300 in which the copy pair management information 1210 is stored.

The copy state information 12103 indicates a current state of copying for the logical volume Vol identified by the volume ID 12102. Specifically, the copy state information 12103 indicates which of 'not copied', 'copying', 'suspending' and 'abnormal' is the state of the copy pair identified by the copy pair ID.

The copy target storage system ID 12104 is an identifier of the storage system 300 providing a logical volume Vol copy-paired with the logical volume identified by the volume ID 12102. That is, an identifier of the secondary storage system 300 is stored in the copy target storage system ID 12104.

The copy target volume ID 12105 is an identifier of a logical volume Vol copy-paired with the logical volume identified by the volume ID 12102. That is, an identifier of a secondary volume as a copy destination of data stored in the logical volume Vol identified by the volume ID 12102 is stored in the copy target volume ID 12105.

An extended copy group ID 12106 is an identifier of an extended group which is used when plural copy group IDs are management collectively as a group.

Although the copy pair management information 1210 has been described as information having a table structure, the copy pair management information 1210 may have a data structure other than the table structure if it has correspondence of copy pairs to copy groups, correspondence of copy pairs to volumes of the storage system and the copy type and copy state of each copy pair.

The copy pair management information 1210a of the storage system 300a and the copy pair management information 1210b of the storage system 300b need not have the same data structure and the same data.

1-10: Volume Management Information

FIG. 13 is a view showing an example of configuration of volume management information 1250 stored in each storage system 300 in Embodiment 1 of the invention.

The volume management information 1250 includes a logical volume ID 12501, volume state information 12502, a capacity 12503, a copy pair ID 12504, and a copy group ID 12505.

The logical volume ID 12501 is an identifier of a logical volume Vol provided by the storage system in which the volume management information 1250 is stored.

The volume state information 12502 indicates a current state of the logical volume Vol identified by the logical volume ID 12501. Specifically, at least one of 'primary volume', 'secondary volume', 'normal', 'abnormal' and 'not mounted' is stored in the volume state information 12502.

For example, when the logical volume Vol identified by the logical volume ID 12501 is a primary volume, 'primary volume' is stored in the volume state information 12502. For example, when the logical volume Vol identified by the logical volume ID 12501 is a secondary volume, 'secondary volume' is stored in the volume state information 12502. Incidentally, 'primary volume' means a volume as a copy source of remote copying and 'secondary volume' means a volume as a copy destination of remote copying.

When the host computer 200 can normally access the logical volume Vol identified by the logical volume ID 12501, 'normal' is stored in the volume state information 12502. On the other hand, when the host computer 200 cannot normally access the logical volume Vol identified by the logical volume ID 12501, 'abnormal' is stored in the volume state information 12502. For example, 'abnormal' is stored in the volume state information 12502 when failure occurs in any disk device 1500 or when failure occurs in copying.

When there is no data stored in the logical volume Vol identified by the logical volume ID 12501, 'not mounted' is stored in the volume state information 12502.

The capacity 12503 is a capacity of the logical volume Vol identified by the logical volume ID 12501. The copy pair ID 12504 is a unique identifier of a copy pair including the logical volume Vol identified by the logical volume ID 12501.

The copy pair ID 12504 is an identifier of a copy pair related to the logical volume ID 12501. Specifically, the pair ID 11303 in the copy information entry 113 as described above with reference to FIG. 7 is stored in the copy pair ID 12504.

The copy group ID 12505 is an identifier of a copy group to which the copy pair ID 12504 belongs. Whenever the management computer 100 issues a copy request, the copy information entry table 113 is created so that a copy group ID added to the copy information entry table 113 is stored.

Although the volume management information 1250 has been described as information having a table structure, the volume management information 1250 may have a data structure other than the table structure if it has the state and capacity of the logical volume. Further, the volume management information 1250 may have correspondence of logical volumes to copy pairs and correspondence of logical volumes to copy groups.

The volume management information 1250a of the storage system 300a and the volume management information 1250b of the storage system 300b need not have the same data structure and the same data.

1-11: Path Management Information

FIG. 24 is a view showing an example of configuration of path management information 1220 stored in each storage system 300 in Embodiment 1 of the invention. The path management information 1220 is a table which holds substantially the same information as that of the path information table held in each local management computer 100 and the central management computer 10. The path management information 1220 includes two kinds of information sets, that is, a logical path information set (122001 to 122007) and a physical path information set (122011 to 122015).

The logical path information set includes a logical path ID 122001, a path type 122002, a primary representative volume 122003, a secondary storage system ID 122004, a secondary representative volume 122005, a relevant physical path ID 122006, and a coupling direction 122007.

The logical path ID 122001 is an identifier of a logical path which is given for management in the storage system.

The path type 122002 indicates the type of the logical path. Any one of a volume path, a volume set path and a storage path is used as the logical path. In the volume path, data in a specific logical volume in the storage system is subject to transfer. In the volume set path, logical volumes in the storage system are subject to transfer. For example, in the volume set path, all data in logical volumes having volume IDs of the same upper 2 digits are subject to transfer so that the storage system transfers the data to the coupling destination storage system. In the storage path, data in all logical volumes in the storage system are subject to transfer.

The representative volume 122003 is an identifier of a logical volume which is subject to transfer in the logical path in the storage system.

The secondary storage system ID 122004 is an identifier of the secondary storage system 300b.

The secondary representative volume 122005 is an identifier of a logical volume which is subject to reception in the logical path.

The relevant physical path ID 122006 is an identifier of a physical path used by the logical path. Identifiers of plural physical paths may be registered in the relevant physical path ID.

The coupling direction 122007 indicates whether the logical path is an UP path (used by the storage system to transmit data) or a DOWN path (used by the storage system to receive data). Incidentally, if the logical path requires no direction, this information is not required.

The physical path information set includes a physical path ID 122011, a port ID 122012, a target storage system ID 122013, a target port ID 122014, and a path state 122015.

The physical path ID 122011 is an identifier of a physical path which is given for management in the storage system.

The port ID 122012 is an identifier of ports provided in the primary storage system 300a.

The target storage system ID 122013 is an identifier of the secondary storage system 300b.

The target port ID 122014 is an identifier of ports provided in the secondary storage system 300b.

The path state 122015 indicates the state of the physical path. Any one of 'Active', 'Inactive' and 'Failure' is indicated as the path state 122015.

Although the path management information 1220 has been described as information having a table structure, the path management information 1220 may have a data structure other than the table structure if it has correspondence of physical paths to ports of the storage systems, the state of each physical path, correspondence of logical paths to physical paths or correspondence of logical paths to volumes of the storage systems.

The path management information 1220a of the storage system 300a and the path management information 1220b of the storage system 300b need not have the same data structure and the same data.

1-12: Contents of IO Request

Figure 14:
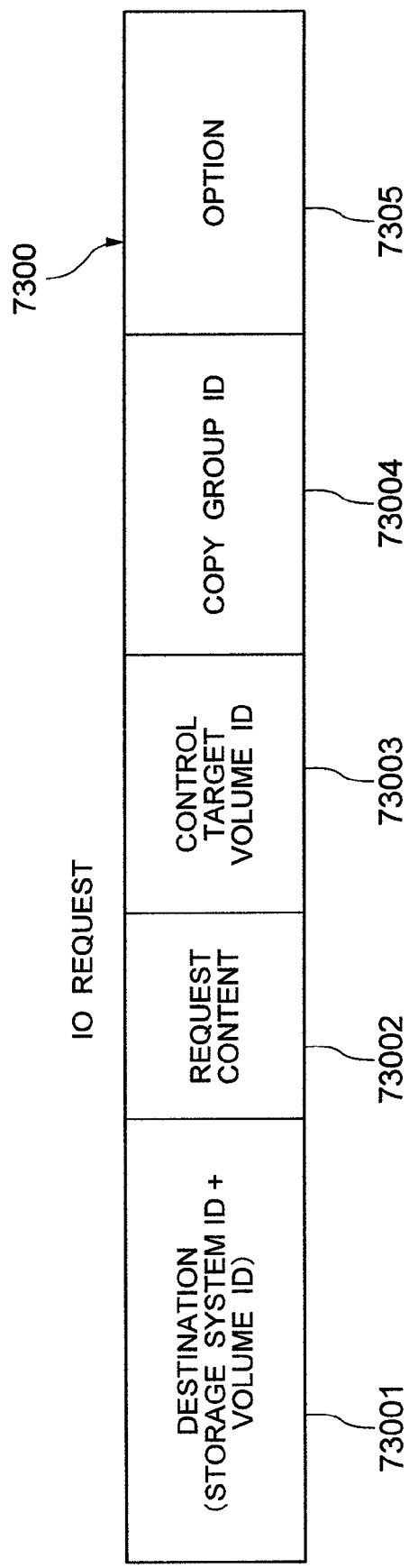
FIG. 14 is a block diagram showing the configuration of an IO request in Embodiment 1.

FIG. 14 is an explanatory view of an IO request 7300 in Embodiment 1 of the invention.

The IO request 7300 is issued by each local management computer 100 or each host computer 200. The IO request 7300 includes a destination 73001, a request content 73002, a control target volume ID 73003, a copy group ID 73004, and an option 73005.

An identifier of a storage system 300 and an identifier of a volume as a destination of transmission of the IO request are stored in the destination 73001. For example, for transmission of the IO request 7300 to a logical volume Vol directly recognized by the local management computer 100 or the host computer 200, the identifier of the logical volume Vol is stored as an identifier of a volume.

The request content 73002 indicates contents of processing required by the IO request 7300. The request content 73002 is any one of 'write request', 'read request' and 'function control request'. The function control request is further classified into 'path construction', 'path cancel', 'path state acquisition', 'remote copy start', 'remote copy suspend', 'remote copy resume', 'remote copy cancel', 'copy state acquisition', 'storage state acquisition', etc.

The control target volume ID 73003 indicates an identifier of a target logical volume Vol processed by the storage system 300 based on the request content of the IO request 7300. That is, the storage system 300 applies processing of the request content to the target control volume ID 73003 written in the received IO request 7300.

Incidentally, the local management computer 100 or the host computer 200 writes a request and a control target volume ID for the logical volume written in the destination, so that the logical management computer 100 or the host computer 200 can transmit a request to another logical volume via the logical volume designated by the destination. For example, this is used when the local management computer is to issue a request to a volume which cannot be accessed by the local management computer.

An identifier of an unrecognized logical volume Vol is stored in the control target volume ID 73003.

The copy group ID 73004 is an identifier of a copy group which is subject to processing based on the IO request 7300. Whenever the management computer 100 issues a copy request, the copy information table 114 is created so that the copy group ID added to the copy information table 114 is stored.

Option information for aiding the IO request 7300 and data or the like requested to be written by the IO request are stored in the option 73005. Incidentally, the copy configuration information includes a copy type, a copy destination storage ID, a copy destination logical volume ID, a copy source storage ID, a copy source logical volume ID, etc.

1-13: Storage System Control Process by Central Management Computer

A storage system control process executed by the central management computer 10 will be described below.

Figure 15:
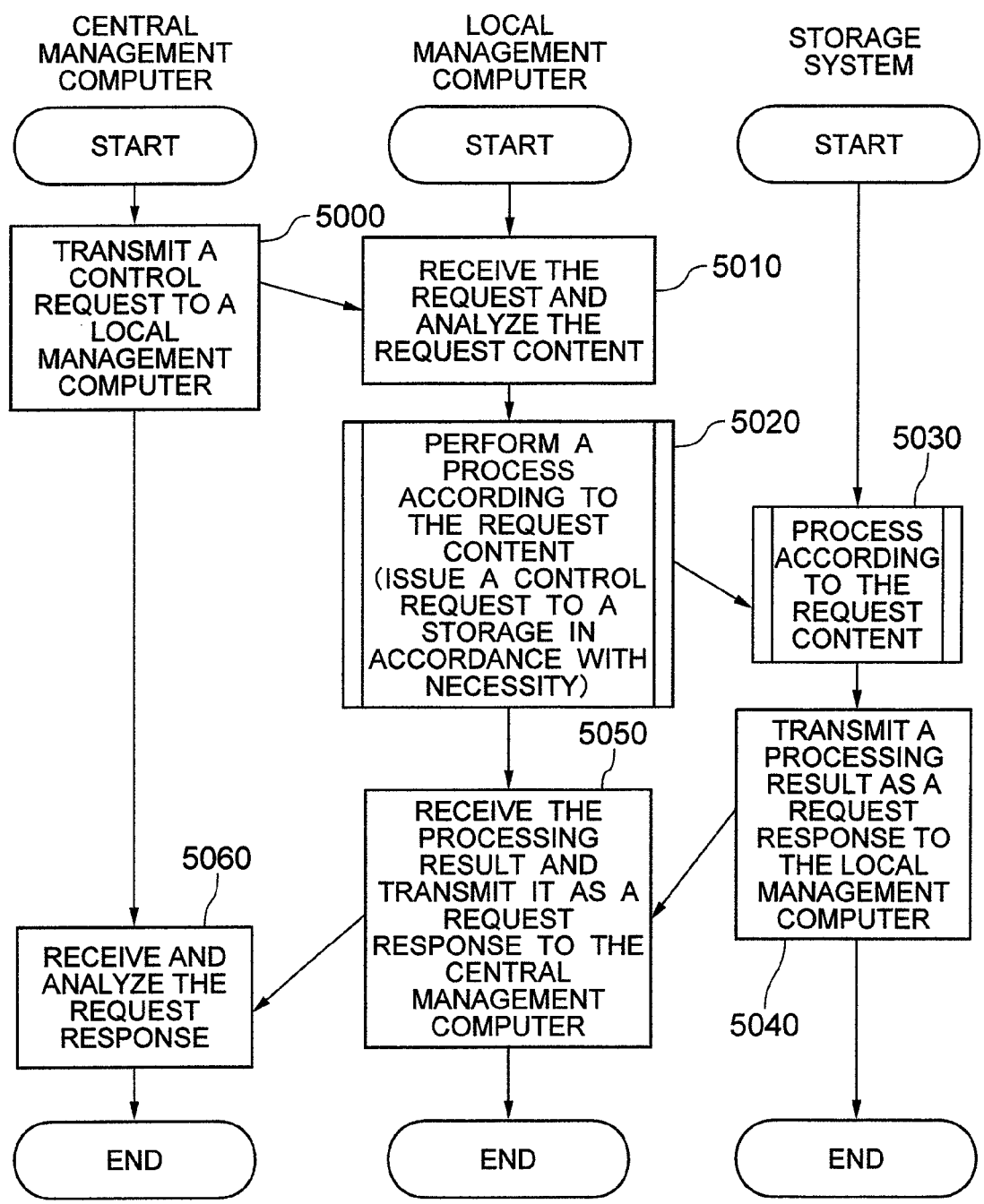
FIG. 15 is a chart showing a storage system control flow from the central management computer in Embodiment 1.

FIG. 15 shows a control flow of a storage system by the central management computer 10. The central management computer 10 controls each storage system 300 though a corresponding local management computer 100.

Specifically, the central management computer 10 makes the processor 20 execute the central management program 12 included in the central management computer 10 to thereby achieve this controlling.

The central management computer 10 creates a control request and transmits the control request to a local management computer 100 (step 5000). Then, the local management computer 100 receives the control request and analyzes contents of the request (step 5010). As a result of the analysis, the local management computer 100 performs processing in accordance with the contents of the request (step 5020). In the step 5020, the local management computer 100 creates an IO request 7300 including the storage control request and transmits the IO request 7300 to the storage system 300 in accordance with necessity. Upon reception of the control request, the storage system 300 analyzes the control request and performs processing based on the contents of the request (step 5030). After completion of processing, the storage system 300 transmits a result of processing as a response to the IO request to the local management computer 100 (step 5040). Upon reception of the response, the local management computer 100 forms the response as a response to the control request from the central management computer 10 and transmits the response to the central management computer 10 (step 5050). Upon reception of the response to the control request, the central management computer 10 analyzes contents of the response and performs processing in accordance with a result of the analysis (step 5060).

Incidentally, the response in the step 5040 means either or both of notice for indicating the completion of processing and information created by the processing to transmit the information to the local management computer 100. The response in the step 5050 means either or both of notice for indicating the completion of processing and information created by the processing to transmit the information to the central management computer 10. As described above, the central management computer 10 issues a control request to the local management computer 100 to control the storage system 300. When the storage system 300 is on the same site as the local management computer 100, the local management computer 100 issues a control request. As described above, in the storage system controlling as a prerequisite for this embodiment, processing on the whole of the computer system is allocated to the central management computer while processing on each site is allocated to the local management computer. Consequently, in the computer system according to this embodiment, the processing load imposed on the whole system can be distributed into parts so that efficient storage system controlling can be achieved. Because all storage control requests from the central management computer 10 can be performed by a common procedure, the step 5020 executed by the local management computer 100 will be described below.

1-14: Process of Creating Storage Information Entry

A process of creating the storage information entry 114L and the storage information entry 114C will be described below. The creating process is executed by the central management computer 10 based on the central management program 12.

Figure 16:
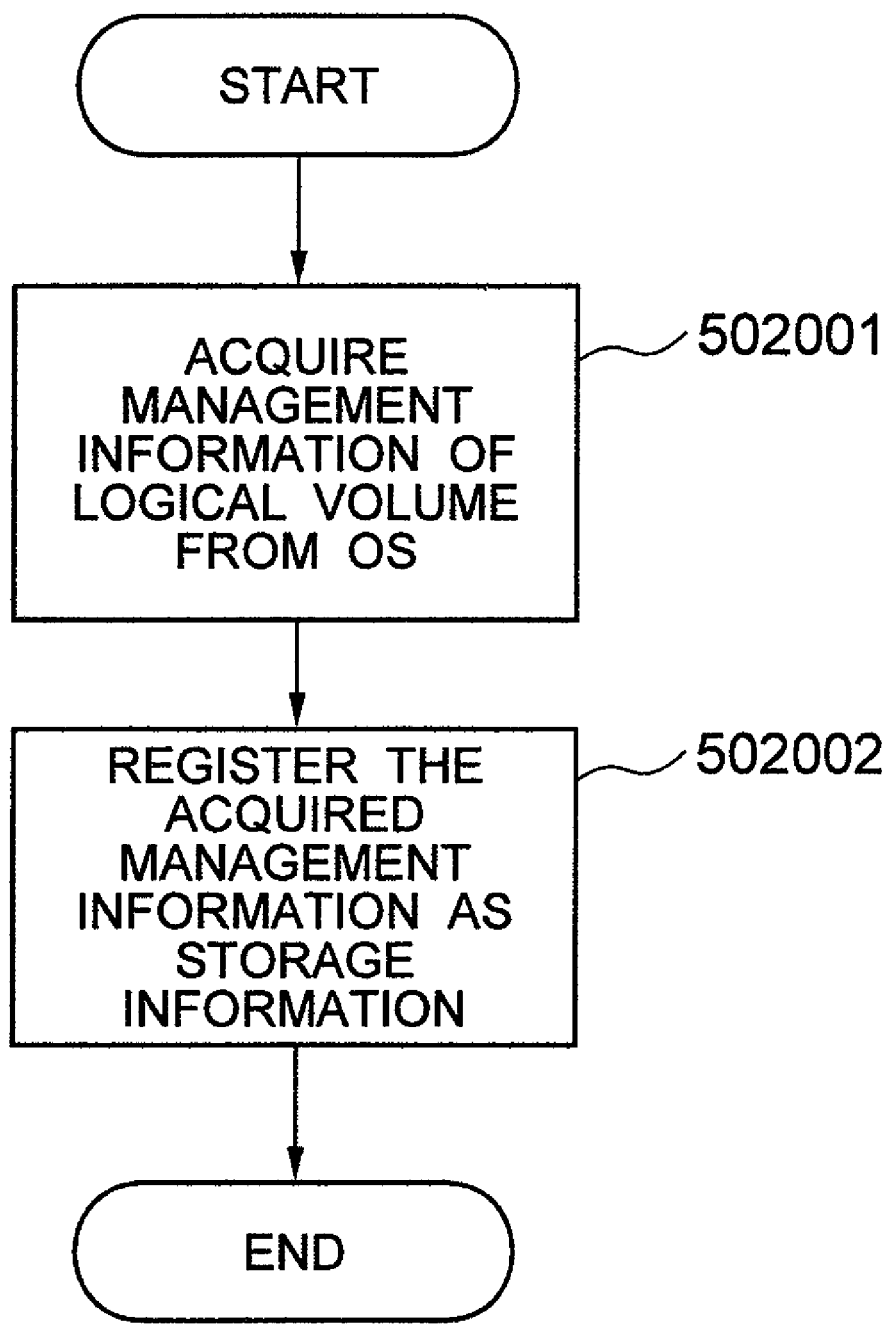
FIG. 16 is a chart showing a flow for generation of storage information from each local management computer in Embodiment 1.

FIG. 16 shows a specific example of the step 5020 in FIG. 15. FIG. 16 is a flow chart when the local management computer 100 creates a storage information entry 114 concerned with the storage system 300. This flow chart is realized when the local management computer 100a receives a storage information entry update request in the step 5010.

(Step 502001) The local management computer 100 acquires management information of the logical volume Vol from the OS 117.

Examples of the management information of the logical volume Vol input by the user are a device number in a mainframe computer, a drive letter or a device filename in an open computer, etc. The local management computer 100a acquires information (storage system ID and volume ID) of the storage system 300 managed by the OS 117 from an operation interface or the like of the OS 117. When the information of the storage system 300 acquired from the OS 117 is insufficient as information for the storage information entry 114, the local management computer 100 may further acquire information of the storage system 300 from the storage system 300 by using an IO request (set as a function control request for storage state acquisition).

(Step 502002) Then, the local management computer 100 registers the information acquired by the step 502001 as storage relevant information in the storage information entry 114L to thereby create or update the storage information entry 114L. The storage relevant information acquired by the step 502001 means information of a storage system ID and a volume ID. Further, the ID which has been registered in the site ID 111 in the local management computer 100 is registered in the site ID in the storage information entry 114.

After execution of this flow chart, the local management computer 100 transmits the storage relevant information (or information indicating volumes of the storage system 300) subject to creation in the storage information entry 114 to the central management computer 10 in the step 5050 of FIG. 15. Upon reception of the information, the central management computer 10 creates (adds or updates) the storage information entry 114C in the step 5060.

Although creation of the storage information entry 114L and the storage information entry 114C has been described above, an updating process can be achieved in such a manner that the local management computer 100 updates part of information stored in the storage information entry 114L and the central management computer 10 updates part of information stored in the storage information entry 114C, based on the information acquired by the step 502001. Although the case where the storage information entry 114L is created earlier has been described in the aforementioned operation, the storage information entry 114C may be created earlier.

Instead of the step 502001, the local management computer 100 may acquire management information of the logical volume from the host computer 200 via the OS 212.

1-15: Process of Creating Path Information

A process of creating path information 115L and path information 115C will be described below. The creating process is executed by the central management computer 10 based on the central management program 12.

The central management computer 10 displays a screen shown in FIG. 18 via an input/output device to aid the user and receives input from the user via the input/output device to create the copy information entry 113. Items displayed in a specific example shown in FIG. 18 and examples of input to the items are as follows.

(1) Path Type
Incidentally, this item may be omitted.
(2) Primary Storage System ID
An example of input is 14001.
(3) Primary Representative Volume ID
An example of input is 23:10.
(4) Port ID of Primary Storage System
An example of input is 23:10:01.
(5) Secondary Storage System ID
An example of input is 14002.
(6) Secondary Representative Volume ID
An example of input is 23:20.
(7) Port ID of Secondary Storage System
An example of input is 23:20:01.
Incidentally, 'Port ID' may mean storage port ID.

The screen shown in FIG. 18 is only exemplary but another method may be used if it is possible to display (or presents) at least the primary storage system ID, the primary storage system port ID, the secondary storage system ID and the secondary storage system port ID.

Incidentally, in this embodiment, a copy pair and a copy group are defined after a logical path is set. In addition, one of volumes included in the copy group is displayed as a representative volume on this screen so that setting of correspondence of the logical path to the copy pair or the copy group can be omitted at the point of time when the copy pair or the copy group is defined. In this manner, correspondence of the logical path to the copy pair (or the copy group) is achieved by path setting using this screen. However, other volumes than the representative volume may be input if correspondence of the logical path to the copy pair or the copy group can be set when the copy pair or the copy group is defined.

Figure 17:
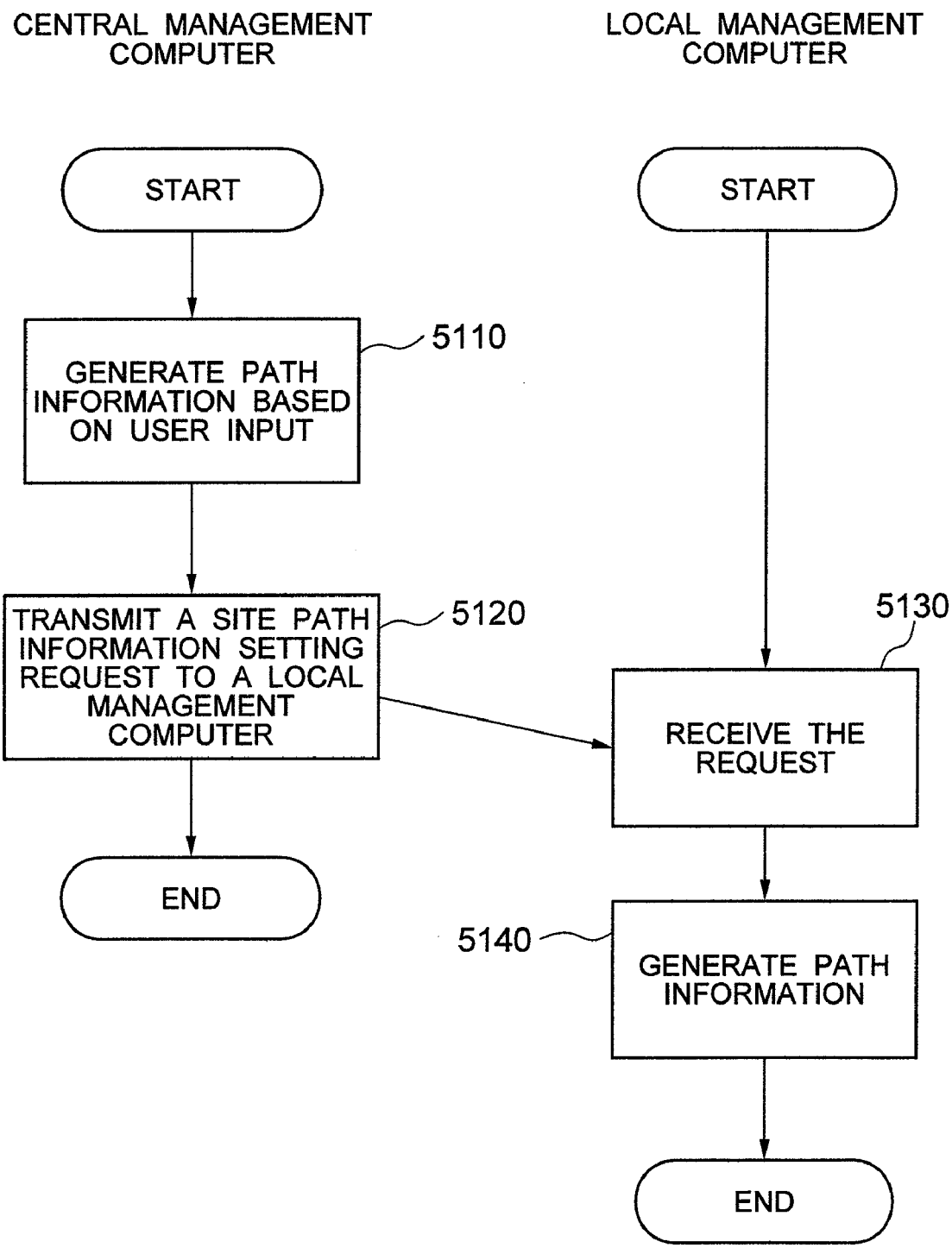
FIG. 17 is a chart showing a storage system control flow from each local management computer in Embodiment 1.

FIG. 17 is a flow chart when the central management computer 10 and each local management computer 100 create path information 115L and path information 115C set in a corresponding storage system 300.

(Step 5110) The central management computer 10 creates path information 115C based on a path setting request received from the user. The path setting request may include a path type, a primary storage system ID, a primary representative volume ID, a primary storage system port ID, a secondary storage system ID, a secondary representative volume ID and a secondary storage system port ID which are received by the central management computer 10 via an input/output device using the screen shown in FIG. 18. Then, the central management computer 10 creates information stored in the path information 115C based on the path setting request.

Description will be made based on examples of input shown in FIG. 18. The central management computer 10 receives the path type (CU), the ID (14001) of the primary storage system 300, the primary representative volume ID (23:10), the ID (14002) of the secondary storage system 300 and the secondary representative volume ID (23:20) in FIG. 18, registers values in the logical path information set 11502, 11503, 11504, 11505 and 11506 respectively and registers a logical path ID uniquely identifiable to the computer system 1 in the logical path information set 11501 by using the received information. Incidentally, a value created by the central management computer 10 may be used as the logical path ID or a value created by any one of the local management computers 100 or the storage system 300 may be used as the logical volume ID. The central management computer 10 registers values in the physical path information set 11512, 11513 and 11515 respectively and registers physical path IDs uniquely identifiable to both the primary and secondary storage systems in the physical path information set 11511 and the logical path information set 11507 respectively by using the primary storage system ID (14001), the primary storage system port ID (23:10:01), the secondary storage system ID (14002), the secondary storage system port ID (23:20:01).

(Step 5120) Then, the central management computer 10 specifies at least one local management computer 100 as a destination of transmission of the created path information 115C and transmits a local path information setting request to the specified local management computer 100. Incidentally, the central management computer 10 can specify the local management computer 100 by referring to the path information 115C.

(Steps 5130 and 5140) Upon reception of the local path information setting request, the local management computer 100 creates path information 115L based on information included in the local path information setting request. Description will be made based on examples of input shown in FIG. 18. By the creation, the following information and values are stored.

(11501)=logical path ID
(11502)=CU
(11503)=14001
(11504)=23:10
(11505)=14002
(11506)=23:20
(11507)=physical path ID corresponding to the combination of 23:10:01 and 23:20:01
(11511)=physical path ID
(11512)=14001
(11513)=23:10:01
(11514)=14002
(11515)=23:20:01

Incidentally, the physical path ID is an ID which can be uniquely allocated to the combination of the storage port of the primary storage system and the storage port of the secondary storage system. A value created by the central management computer may be used as the physical path ID or a value created by any one of the local management computers or the storage system 300 may be used as the physical path ID.

Although creation of the path information 115C and the path information 115L has been described, an updating process can be achieved in such a manner that the central management computer 10 updates part of information stored in the path information 115C based on the information acquired by the step 5110 or each local management computer 100 updates part of information stored in the path information 115C and the path information 115L based on a local path setting request received from the central management computer 10. Incidentally, when it is necessary to add a new physical path to the logical path ID which has been already created, information can be added and registered in the procedure of the steps 5110 to 5140 with respect to information corresponding to the created physical path ID.

Although the aforementioned process has been described in the case where the path information 115C is created earlier, the path information 115L may be created earlier.

1-16: Process of Creating Copy Information

A process of creating the copy information entry 113L and the copy information entry 113C will be described below. The process of creating the copy information entry 113L and the copy information entry 113C is executed by the central management computer 10 based on the central management program 12.

The central management computer 10 displays the screen shown in FIG. 20 via the input/output device to aid the user and receives input from the user via the input/output device to create the copy information entry 113. Items displayed as specific examples shown in FIG. 20 and examples of input to the items are as follows.

(1) Copy Name (an arbitrary character string which is named by the user for management of remote copying and which corresponds to the copy group)
An example of input is Grp1.

(2) Copy Type
An example of input is asynchronous remote copying.

(3) Site ID, Storage System ID and Volume ID as Copy Source Information
An example of input is Primary1 as the site ID, 14001 as the storage system ID and 23:10 as the logical volume ID.

(4) Site ID, Storage System ID and Volume ID as Copy Destination Information
An example of input is Remote1 as the site ID, 14002 as the storage system ID and 23:20 as the logical volume ID.

(5) Copy Option Information
An example of input is SVOL OVERWRITE to enable data to be written into the copy destination logical volume even after start of copying.

Incidentally, the screen shown in FIG. 20 is only exemplary but another method may be used if it is possible to display (or present) at least the ID of a volume serving as the primary volume, the ID of a storage system providing (or having) the volume, the ID of a volume serving as the secondary volume and the ID of a storage system providing (or having) the volume. The same rule can be applied to other information (such as the copy type, the site and the copy name).

Although the use of a character sting input by the user as the copy name brings improvement of user-friendliness, other information such as an ID or character string created by the central management computer 10 may be used instead.

Figure 19:
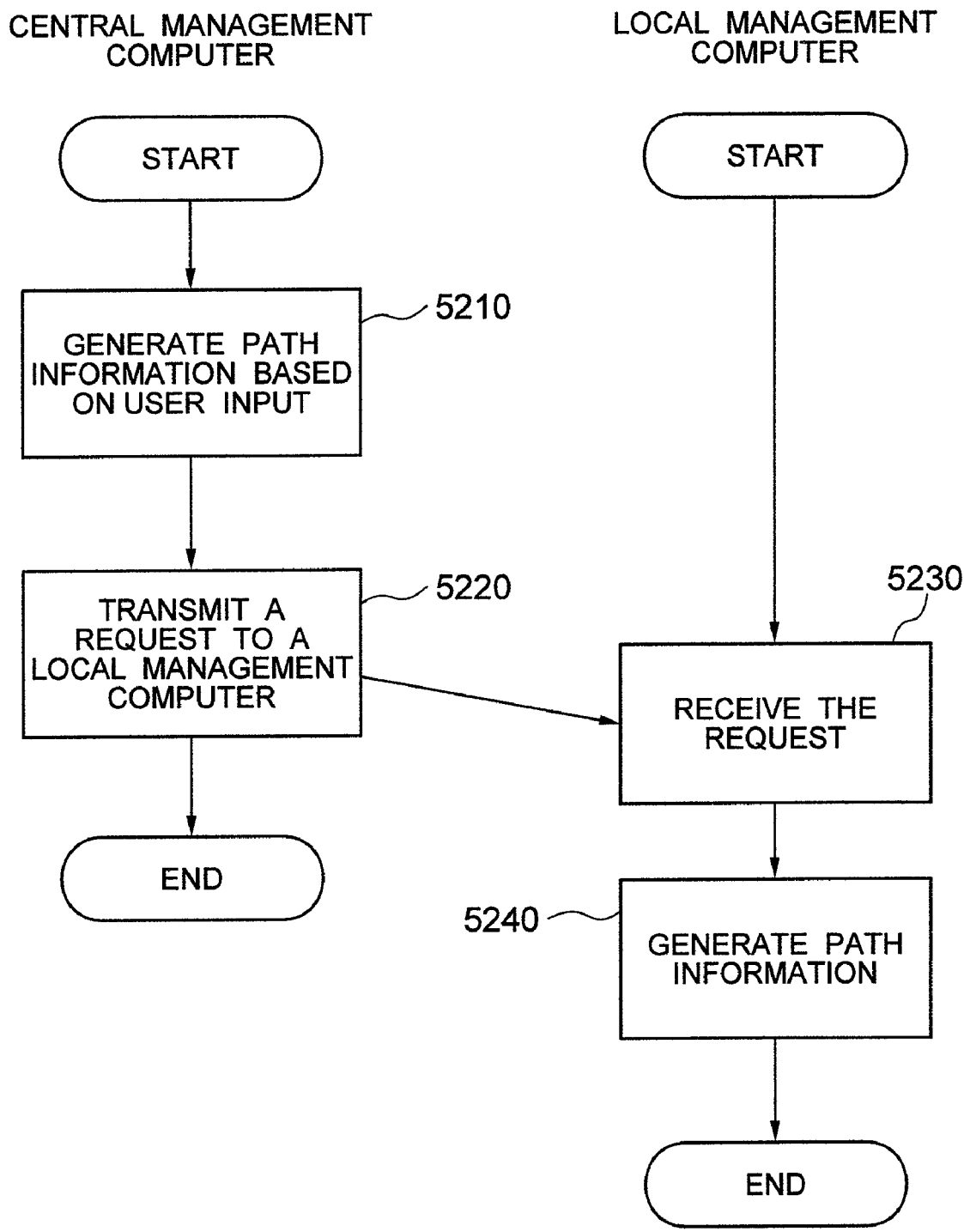
FIG. 19 is a chart showing a flow for transferring path information from the central management computer to a local management computer in Embodiment 1.

FIG. 19 is a flow chart when the central management computer 10 creates the copy information entry 113C and the copy information entry 113L set in the storage system 300.

(Step 5210) The central management computer 10 first creates the copy information entry 113C based on a copy information entry setting request from the user. The copy information entry setting request includes the ID of a volume serving as the primary volume, the ID of a storage system providing (or having) the volume, the ID of a volume serving as the secondary volume and the ID of a storage system providing (or having) the volume. These IDs are received by the central management computer 10 via the input/output device using the screen shown in FIG. 20. The information input by the user may include other information (such as the copy type, the site and the copy name). Then, the central management computer 10 creates information stored in the copy information entry 113C based on information included in the copy information entry setting request.

Description will be made based on example of input shown in FIG. 20. The central management computer 10 stores the copy name (Grp1) on the screen of FIG. 20 in 11300, the copy type (asynchronous remote copying) and copy option information in 11301, the site ID (Primary1) in 11304, the primary storage system ID (14001) in 11306, the primary volume ID (23:10) in 11307, the secondary site ID (Remote1) in 11305, the secondary storage system ID (14002) in 11308, and the secondary volume ID (23:20) in 11309 for the copy information entry 113C. Then, the central management computer 10 creates a pair ID as a unique identifier of the primary storage system and the secondary storage system in accordance with each copy pair and stores the pair ID in 11303 in the copy information entry 113C.

(Step 5220) The central management computer 10 specifies at least one local management computer 100 as a destination of transmission of information of the created copy information entry 113C and transmits a local copy information entry setting request to the specified local management computer 100. Incidentally, the central management computer 10 can specify the local management computer 100 by referring to the storage information entry 114C. The local copy information entry setting request includes, as information, the ID of a volume serving as the primary volume, the ID of a storage system providing (or having) the volume, the ID of a volume serving as the secondary volume and the ID of a storage system providing (or having) the volume. These IDs correspond to information stored in the storage information entry 114C created based on the copy information entry setting request. The request may include other information (such as the copy type, the site and the copy name).

(Steps 5230 and 5240) Upon reception of the copy information entry setting request, the local management computer 100 creates the copy information entry 113L based on information included in the local copy information entry setting request. Description will be made based on examples of input shown in FIG. 20. By the creation, the following information and values are stored.

(1) 11300=Grp1 as Copy Name
(2) 11301=asynchronous remote copying as Copy Type
Incidentally, because SVOL OVERWRITE is input as copy option information, this input value is also stored.
(3) 11304=Primary1 as Primary Site ID
(4) 11306=14001 as Primary Storage System ID
(5) 11307=23:10 as Primary Volume ID
(6) 11305=Remote1 as Secondary Site ID
(7) 11308=14002 as Secondary Storage System ID
(8) 11309=23:20 as Secondary Volume ID Although creation of the copy information entry 113L and the copy information entry 113C has been described, an updating process can be achieved in such a manner that the central management computer 10 updates part of information stored in the copy information entry 113C based on the information acquired by the step 5210 or each local management computer 100 updates part of information stored in the copy information entry 113C and the copy information entry 113L based on a local copy information entry setting request received from the central management computer 10. Incidentally, when it is necessary to create a copy pair while designating the copy group which has been already created, information included in the copy information entry setting request can be registered in the copy information entry 113C and the copy information entry 113L corresponding to the created copy group in the procedure of the steps 5210 to 5240.

Although the aforementioned process has been described in the case where the copy information entry 113C is created earlier, the copy information entry 113L may be created earlier.

1-17: Process of Creating Path Remote Copy Relevant Information

A process of creating path remote copy relevant information entry 11 will be described below. The process of creating path remote copy relevant information 11 is executed by the central management computer 10 based on the central management program 12. Although it can be thought of that this process is executed with creation, updating and deletion of the storage information entry 115C or the copy information entry 113C as a turning point, the path remote copy relevant information entry 11 may be created in accordance with another turning point (e.g. user's instruction).

Figure 21:
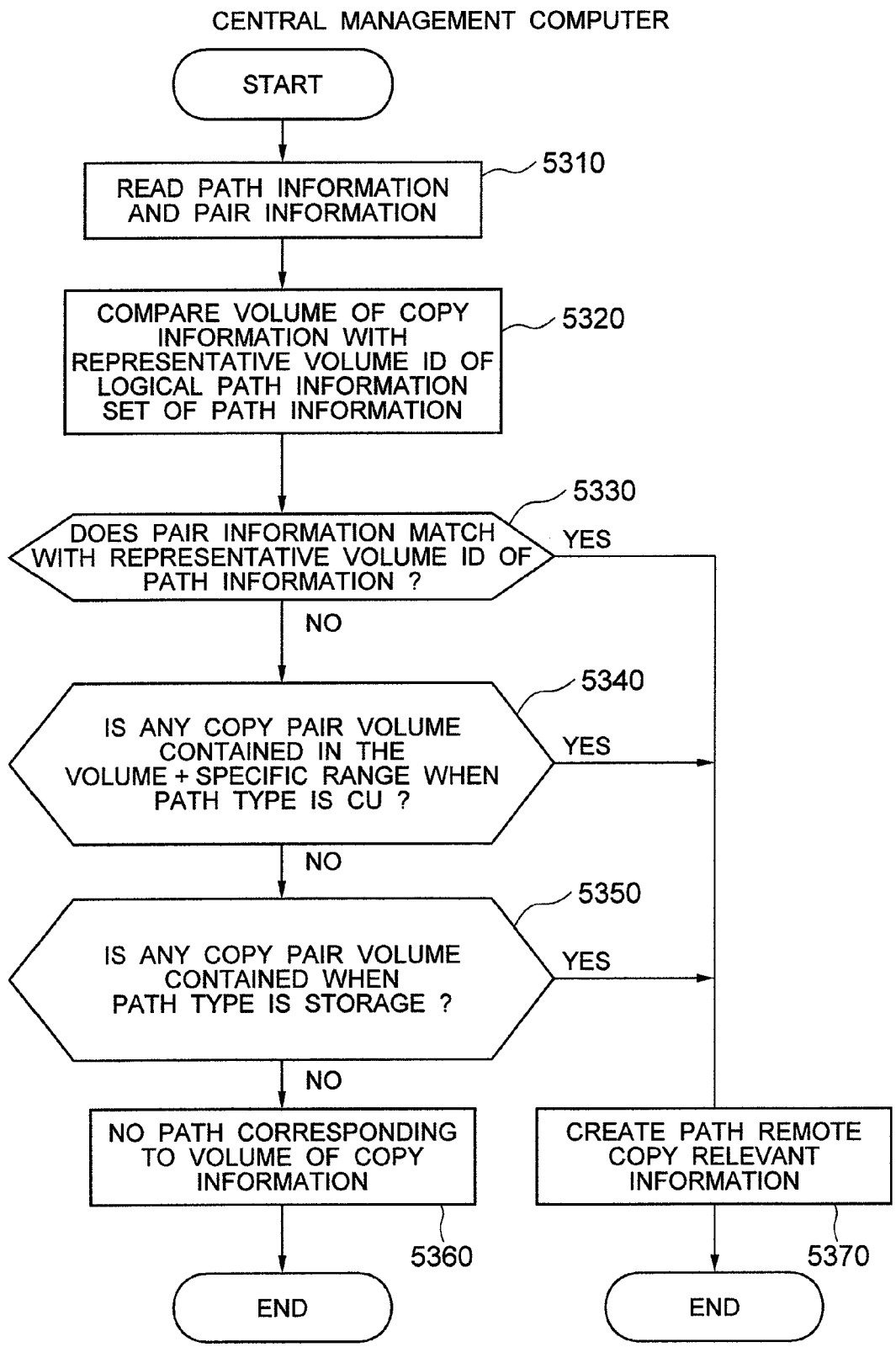
FIG. 21 is a chart showing a flow for generating path remote copy relevant information in Embodiment 1.

FIG. 21 is a flow chart when the central management computer 10 creates path remote copy relevant information 11.

The central management computer 10 first refers to the path information 115C and the copy information entry 113C (step 5310). Then, the central management computer 10 compares the representative volumes 11504 and 11506 in the logical path information set in the path information 115C with the volume IDs in the copy information entry 113.

When the comparison results in consistency (Yes in step 5330), the central management computer 10 creates path remote copy relevant information 11 (step 5370). The central management computer 10 reads the logical path ID 11501, the physical path ID 11511 and the copy group ID from the path information 115C and the copy information entry 113C referred to in advance and registers these IDs as path remote copy relevant information.

When the comparison results in inconsistency (No in the step 5330), the central management computer 10 further confirms the path type in the path information table. When the path type is volume set path (CU), the central management computer 10 judges whether the volume IDs in the copy information entry table are in a specific volume range (e.g. 256) or not (step 5340). When the judgment in the step 5340 results in consistency (Yes in the step 5340), the central management computer 10 creates path remote copy relevant information (step 5370).

When the judgment in the step 5340 results in inconsistency (No in the step 5340) and the path type is storage (Yes in the step 5350), the central management computer 10 creates path remote copy relevant information (step 5370).

When the path type is not storage (No in the step 5350), the central management computer 10 does not create path remote copy relevant information 11 but terminates the process of creating path remote copy relevant information (step 5360).

By the aforementioned process, information indicating correspondence of logical paths to physical paths and correspondence of logical paths to copy groups can be stored or updated in the path remote copy relevant information.

Incidentally, because correspondence of logical paths to physical paths is stored in the path information 115C, reference to the path remote copy relevant information for acquiring correspondence of logical paths to physical paths may be hereafter replaced by reference to the path information 115C. In addition, correspondence of logical paths to copy groups may be stored in place of the path remote copy relevant information in the copy information entry. In this case, reference to the path remote copy relevant information for acquiring correspondence of copy groups to logical paths may be replaced by reference to the copy information entry 113C.

In the aforementioned processing and inputting (or information concerned with setting received by the central management computer), correspondence of copy groups (or copy pairs) to logical paths is obtained indirectly. However, alternatively, in the process of creating the copy information entry, correspondence of copy groups to logical paths may be received by the central management computer 10 and stored in the path remote copy relevant information.

1-18: Process of Constructing Logical Path

A process of constructing logical paths will be described below. The process of constructing logical paths is achieved when the central management computer 10 issues a storage logical path constructing request to the storage system 300 via the local management computer 100. Referring to FIG. 15, processing in the central management computer 10, the local management computer 100 and the storage system 300 will be described.

In step 5000 in FIG. 15, the central management computer 10 receives a logical path constructing request. Incidentally, the logical path constructing request is received after the path information creating process is executed. An 'apply' button may be added to the screen shown in FIG. 18 so that user's operation of the input/output device for pushing the button can be regarded as reception of the logical path constructing request. The central management computer 10 transmits a local logical path constructing request to all the logical management computers 100.

In step 5010 in FIG. 15, each local management computer 100 receives the local logical path constructing request.

Figure 22:
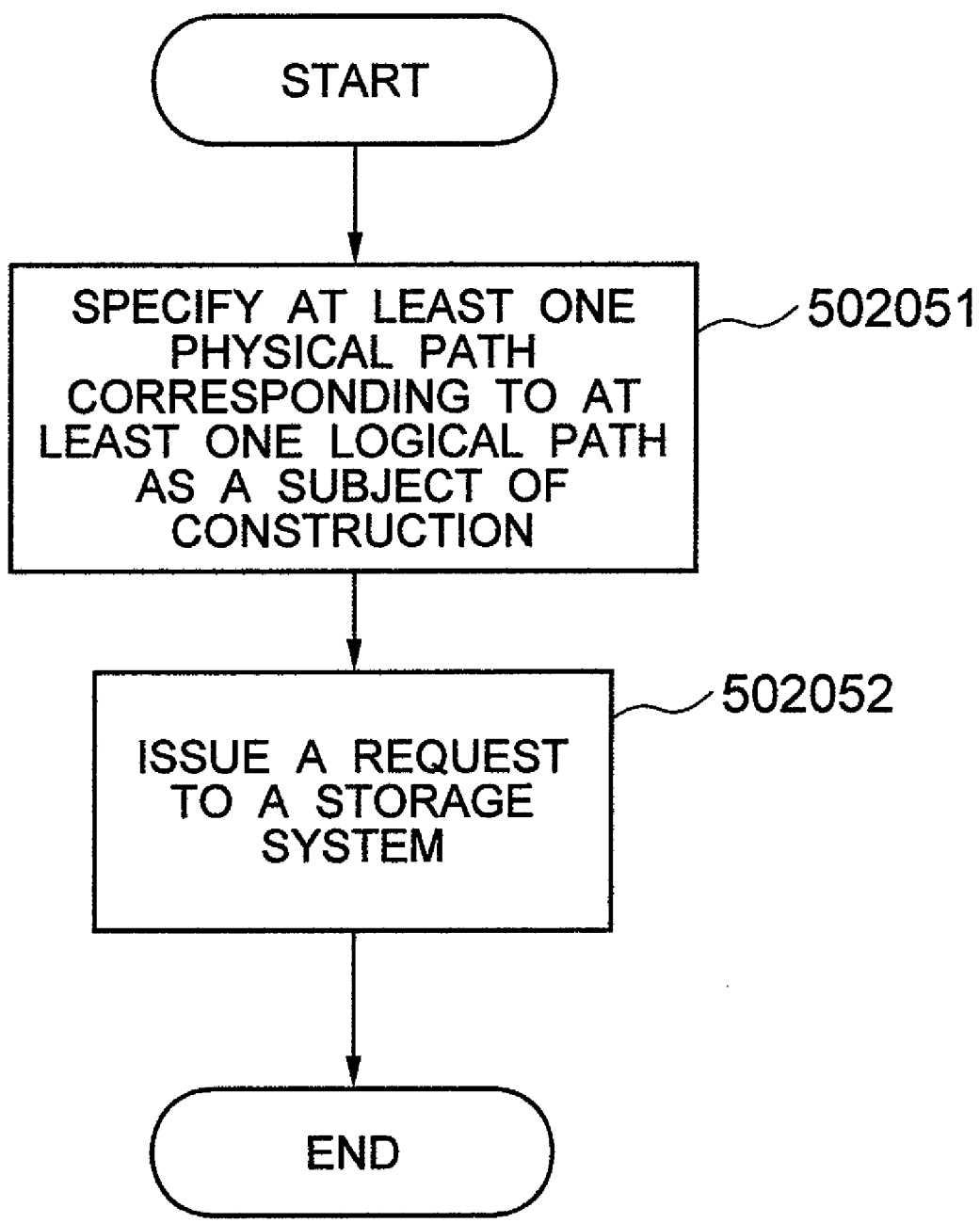
FIG. 22 is a chart showing a flow for requesting a storage system to construct logical paths in Embodiment 1.

In step 5020 in FIG. 15, the following process is performed as shown in FIG. 22.

(Step 502051) The local management computer 100 specifies logical paths already constructed in the storage system by referring to the path information 115L, specifies at least one logical path as a target of construction based on information of the specified constructed logical paths and specifies at least one physical path corresponding to the target logical path. Although specifying of the constructed logical paths can be achieved when information concerned with logical paths in the storage system 300 is received and compared with the path information 115, another method may be used.

The local management computer 100 further specifies the following information by referring to the path information 115L.

(1) Primary storage system ID and secondary storage system ID (2) Information corresponding to at least one logical path as a target of construction (3) Information corresponding to at least one physical path corresponding to the target logical path The local management computer 100 creates a storage logical path constructing request including the aforementioned information (1), (2) and (3). Incidentally, the storage logical path constructing request may be formed from a plurality of commands if it can be judged that the aforementioned information and logical paths are requested to be constructed.

Although it can be thought of that the information (2) is the ID of the logical path, the information (2) need not be the ID if it can be judged to be any other path than the constructed logical paths. Although it can be thought of that the information (3) is the storage port ID of the primary storage system and the storage port ID of the secondary storage system, the information (3) may be any other information if it can specify the physical path.

(Step 502052) The local management computer 100 transmits the created storage logical path constructing request to the storage system.

Figure 26:
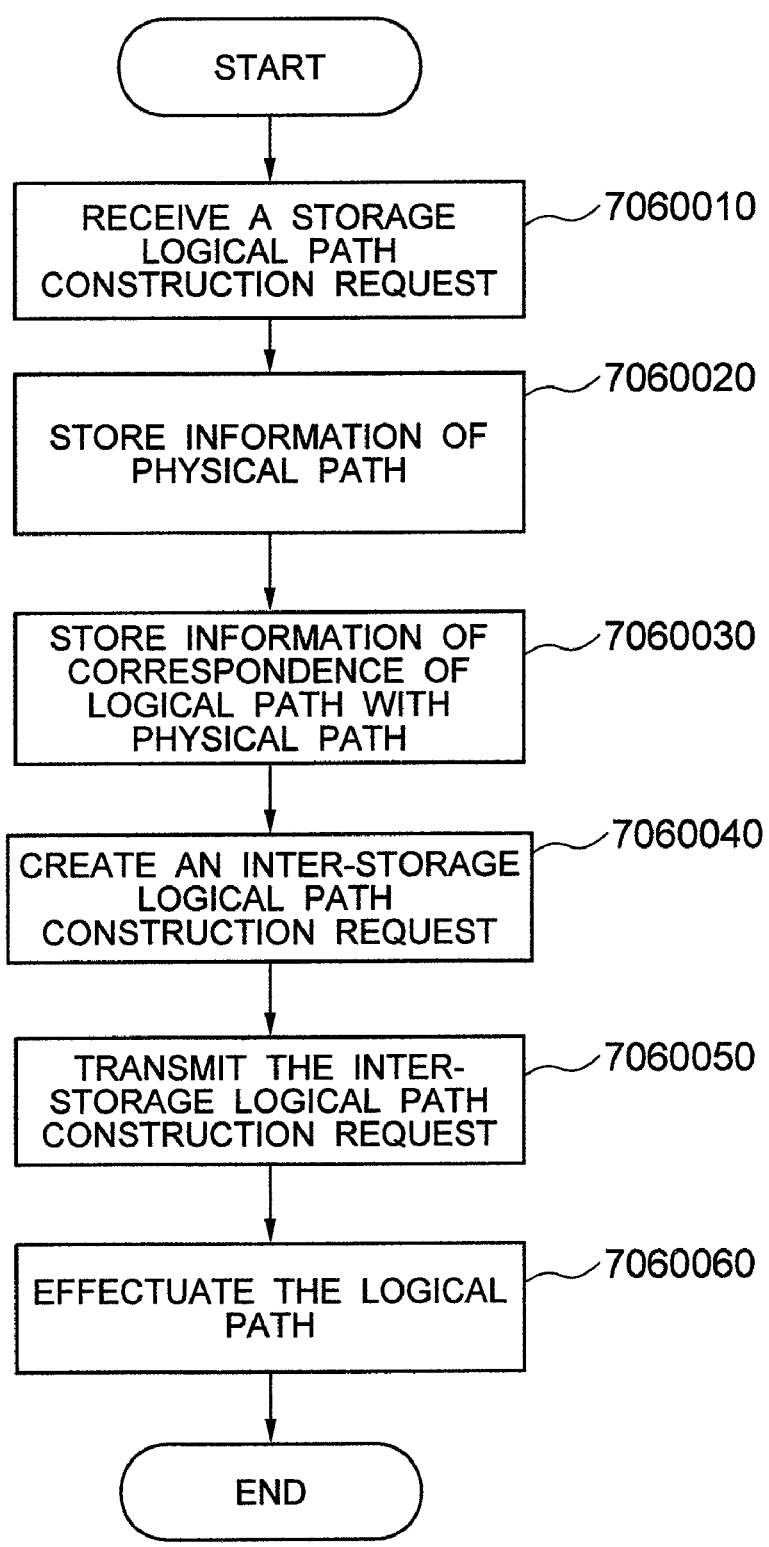
FIG. 26 is a chart showing a processing flow for construction of paths in the storage system.

In step 5030 in FIG. 15, the storage system 300 performs the following process as shown in FIG. 26.

(Step 7060010) The storage system 300 receives the storage logical path constructing request and specifies the storage port (hereinafter also referred to as primary storage port) forming the physical path of the storage system 300, the secondary storage system and the storage port (hereinafter also referred to as secondary storage port) forming the physical path of the secondary storage system.

(Step 7060020) The storage system 300 judges whether information of the physical path formed from the primary storage port and the secondary storage port is stored in the path management information 1220 or not. When the information is not stored, the storage system 300 stores the primary storage port ID, the secondary storage system ID and the secondary storage port ID in the path management information 1220.

(Step 7060030) The storage system 300 stores information indicating correspondence of the designated physical path to the logical path designated by the received storage logical path constructing request, in the path management information 1220. Incidentally, when the combination of the primary volume (or primary representative volume) and the secondary volume (or secondary representative volume) in the logical path which has been already stored is the same as the combination of the primary volume (or primary representative volume) and the secondary volume (or secondary representative volume) corresponding to the logical path which is currently subject to construction, the same ID as the ID of the logical path which has been already stored is allocated to the physical path which is currently subject to construction. Otherwise, another ID is allocated to the physical path which is currently subject to construction. Although the same ID is consequently allocated to all logical paths corresponding to the combination of the same primary volume (or primary representative volume) and the same secondary volume (or secondary representative volume), another judgment may be used so that the same ID is allocated to plural logical paths.

(Step 7060040) The storage system 300 creates an inter-storage logical path constructing request including information corresponding to information included in the storage logical path constructing request to the storage system 300 (e.g. the secondary storage system when the storage logical path constructing request is transmitted to the primary storage system) which is a partner in logical path construction.

Incidentally, information included in the inter-storage logical path constructing request is as follows.

(1) The ID of the primary storage system and the ID of the secondary storage system designated by the storage logical path constructing request.

(2) Information corresponding to the logical path designated by the storage logical path constructing request.

(3) Information corresponding to the physical path corresponding to the logical path designated by the storage logical path constructing request.

Examples of the information (2) and (3) may be information described above in the storage logical path constructing request.

(Step 7060050) The storage system 300 transmits the created inter-storage logical path constructing request to the secondary storage system.

Upon reception of the request, the secondary storage system performs the steps 7060010 to 7060030 and 7060060 as a process corresponding to the request.

(Step 7060060) The storage system 300 makes the logical path active. The storage system 300 may confirm that the primary storage system 300a can use the physical path periodically with the secondary storage system 300b with respect to the logical path which is made active. As a method of confirming the physical path, there is a method in which the storage system 300a transfers a data transfer frame 1840 of empty data to the secondary storage system 300b periodically and confirms the physical path by a response from the secondary storage system 300b.

By the aforementioned process, the storage system 300 is requested to construct the logical path in accordance with the path information 115C or the path information 115L stored in the local management computer 100, so that the storage system can construct the logical path in accordance with the request.

Incidentally, the central management computer 10 may transmit the local path constructing request to part of the local management computers 100 in place of all of the local management computers 100. In this case, it can be thought of that the part of the local management computers are specified in such a manner that information concerned with the logical paths which have been already constructed in the storage system 300 is acquired from the storage system 300 via the local management computer and compared with the path information 115C. However, another method may be used for specifying the part of the local management computers 100.

Incidentally, the aforementioned process can be applied to creation of the path information 115C and the path information 115L, updating of part thereof and deletion thereof.

1-19: Process of Starting Remote Copying

A process of starting remote copying will be described below. The process of starting remote copying is achieved when the central management computer 10 issues a remote copy start request to the storage system 300 via the local management computer 100. Referring to FIG. 15, processing in the central management computer 10, the local management computer 100 and the storage system 300 will be described.

In step 5000 in FIG. 15, the central management computer 10 receives a remote copy start request. Incidentally, the remote copy start request is received after the process of creating copy information is executed. An 'apply' button may be added to the screen shown in FIG. 20 so that user's operation of the input/output device for pushing the button can be regarded as reception of the remote copy start request. The central management computer 10 transmits a local remote copy start request to all the logical management computers 100.

In step 5010 in FIG. 15, each local management computer 100 receives the local remote copy start request.

Figure 23:
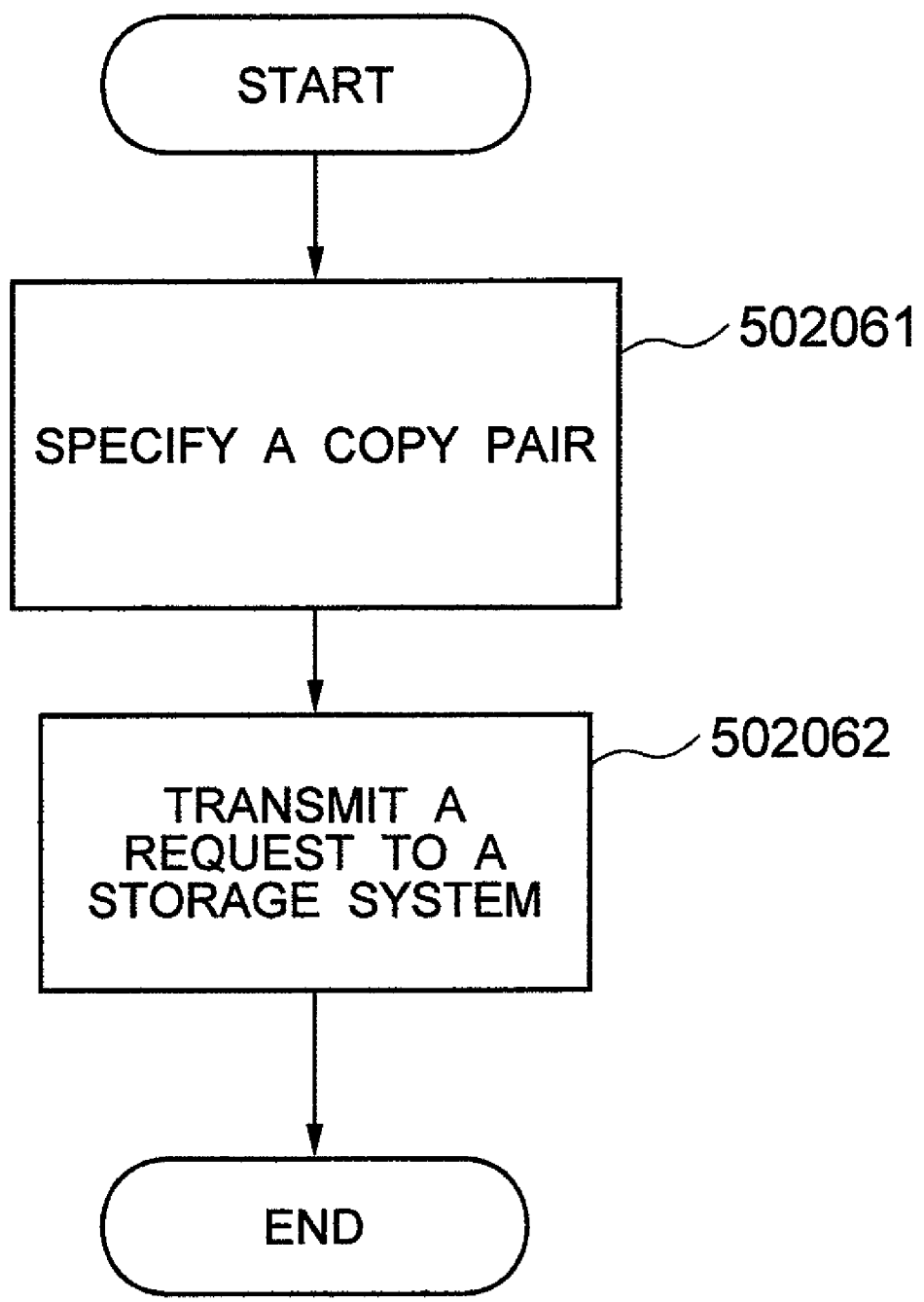
FIG. 23 is a chart showing a flow for requesting a storage system to start remote copying in Embodiment 1.

In step 5020 in FIG. 15, the following process is performed as shown in FIG. 23.

(Step 502061) The local management computer 100 specifies copy pairs which have started remote copying, by referring to the local copy information and specifies at least one copy pair which is subject to start of remote copying, based on the specified copy pairs which have been started remote copying. Although specifying of the copy pairs which have already started can be achieved when information concerned with copy pairs in the storage system 300 is received and compared with the path information 115, another method may be used.

The local management computer 100 further specifies the following information by referring to the local copy information.

(1) The ID of the primary storage system and the ID of the primary volume in the copy pair subject to start (2) The ID of the secondary storage system and the ID of the secondary volume in the copy pair subject to start (3) The copy type of the copy pair subject to start (4) The ID of the copy pair subject to start (5) The ID of a copy group including the copy pair subject to start The local management computer 100 creates a storage copy pair start request including the information (1) to (5). Incidentally, the storage copy pair start request may be formed from a plurality of commands if the aforementioned information and start of the copy pair can be judged to be requested.

(Step 502062) The local management computer 100 transmits the created storage copy pair start request to the primary storage system (or the secondary storage system).

Figure 27:
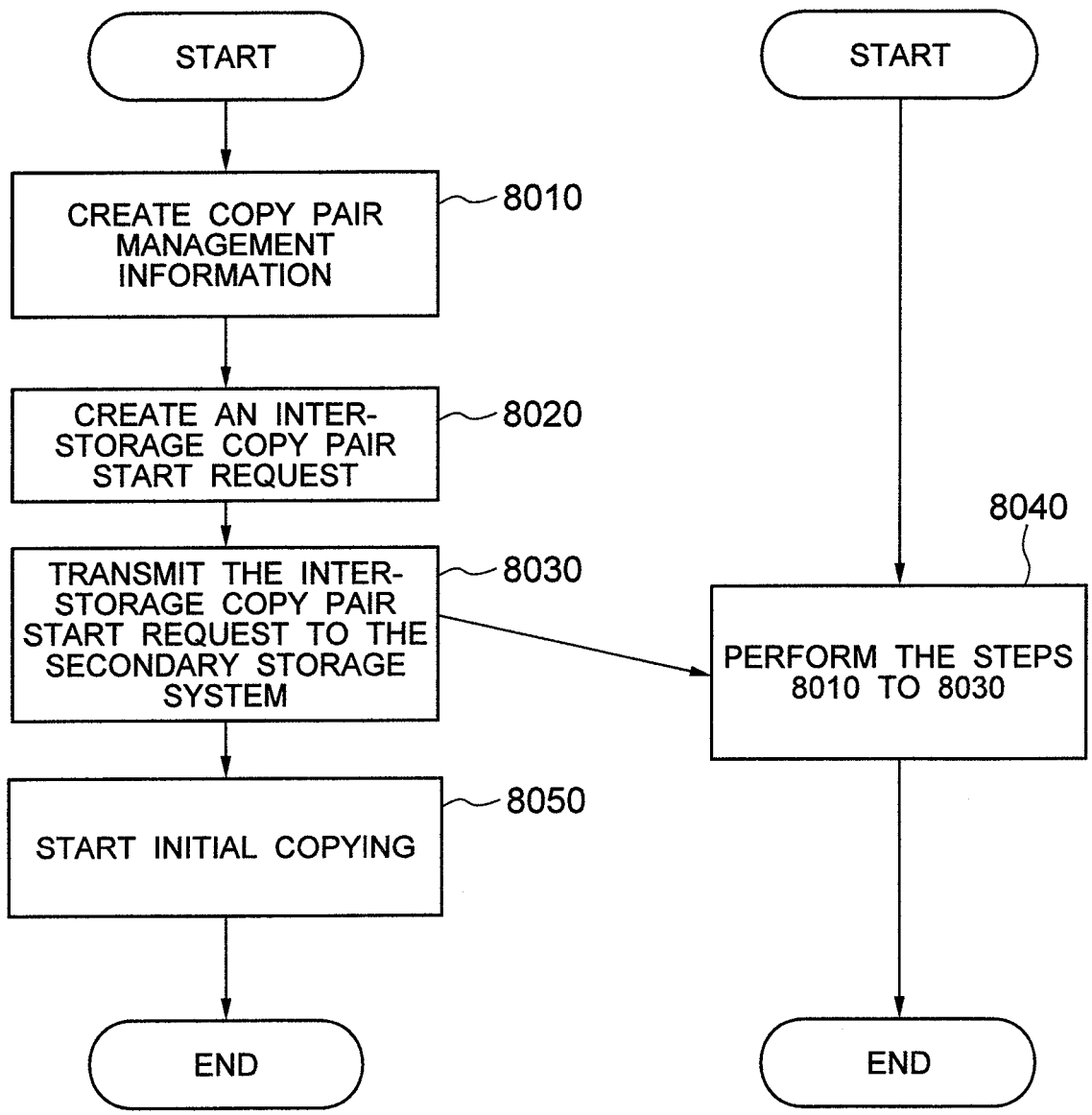
FIG. 27 is a flow chart of a remote copying start process executed (hereinafter referred to as initial copy process) by primary and secondary storage systems in Embodiment 1.

In step 5030 in FIG. 15, the storage system 300 performs the following process as shown in FIG. 27.

(Step 8010) The primary storage system 300a receives the storage copy pair start request and creates copy pair management information 1210a based on information extracted from the request.

Specifically, the primary storage system 300a stores the ID of the primary volume designated by the storage copy pair start request as a copy source primary volume in the logical volume ID 12102 in the copy pair management information 1210. Then, the primary storage system 300a stores 'initial copying' in the copy state information 12103 in the copy pair management information 1210. The primary storage system 300a further stores the ID of the copy pair included in the request in the copy pair ID 12101, stores the ID of the copy group included in the request in the copy group ID 12100 and stores the copy type included in the request in the copy type 12106 in the copy pair management information 1210.

(Step 8020) The storage system 300a creates an inter-storage copy pair start request including information corresponding to information included in the storage copy pair start request to the storage system 300b which is a partner in start of remote copying.

Incidentally, information included in the inter-storage copy pair start request is as follows.

(1) The ID of the primary storage system and the ID of the primary volume in the copy pair subject to start (2) The ID of the secondary storage system and the ID of the secondary volume in the copy pair subject to start (3) The copy type of the copy pair subject to start (4) The ID of the copy pair subject to start (5) The ID of a copy group including the copy pair subject to start (Step 8030) The storage system 300a transmits the created inter-storage logical path constructing request to the secondary storage system 300b.

(Step 8040) Upon reception of the request, the secondary storage system 300b performs the steps 8010 to 8030 as a process corresponding to the request to create or update the copy management information 1210b.

(Step 8050) Then, the primary storage system 300a starts initial copying in which data stored in the primary volume is copied to the secondary volume in the secondary storage system.

Incidentally, during initial copying, the primary storage system 300a reads data from the primary volume identified by the logical volume ID 12102 in the copy pair management information 1210a, creates an initial copy request including the ID of the read source primary volume (or the ID of the corresponding secondary volume), the address of the primary volume (or the address of the corresponding secondary volume) and the read data, and transmits the initial copy request to the secondary storage system 300b.

Upon reception of the initial copy request, the secondary storage system 300b writes data read from the primary volume in the address of the secondary volume designated by the request.

1-20: IO Request Processing by Storage System

Processing in the storage system 300 at the time of reception of an IO request will be described below.

Figure 25:
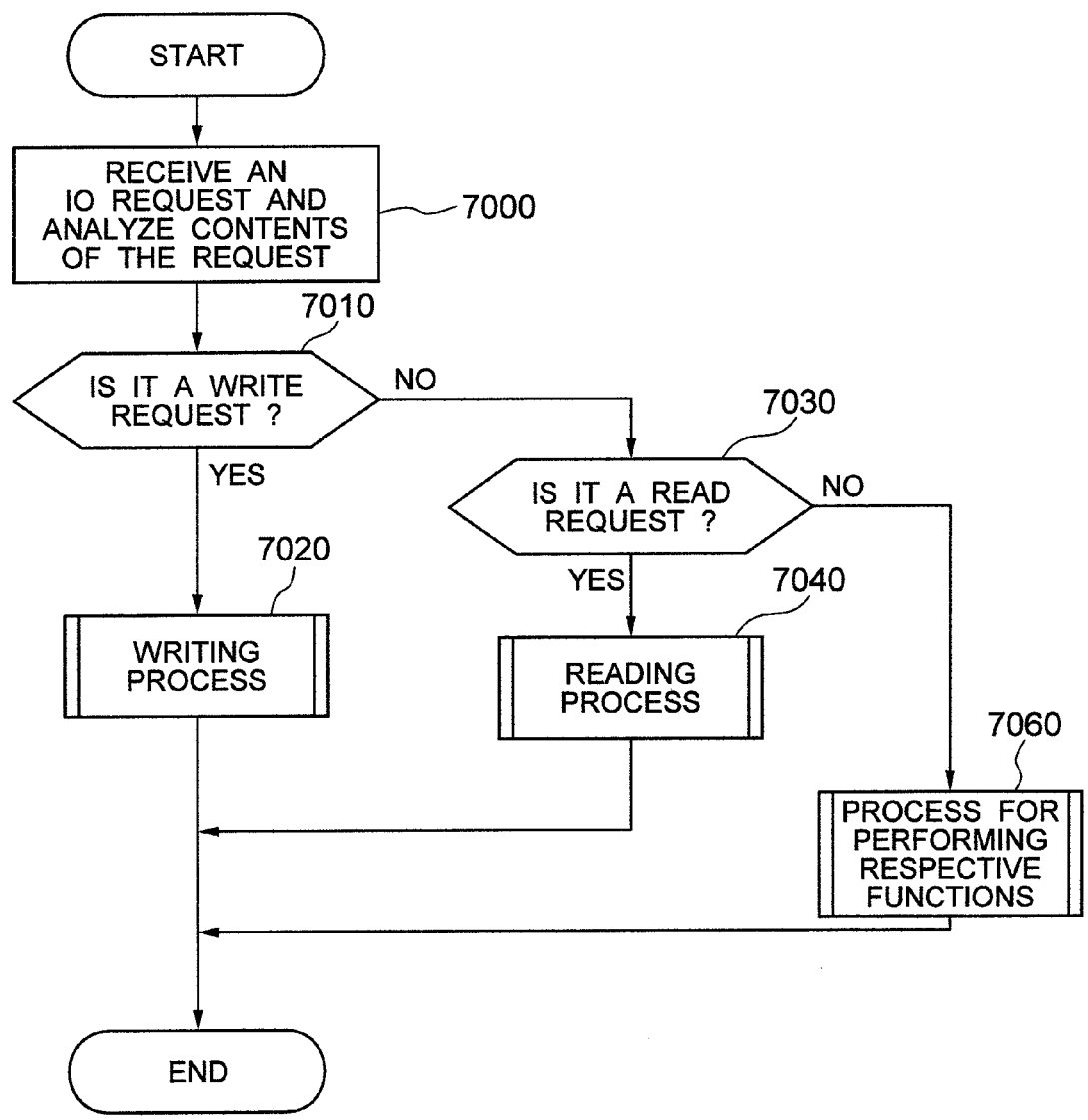
FIG. 25 is a chart showing a processing flow in a storage system after reception of an IO request in Embodiment 1.

FIG. 25 shows a processing flow after the storage system 300 receives an IO request. Incidentally, this processing is achieved when the IO processing program 1290 is executed by the processor 1310.

(Steps 7000 and 7010) The storage system 300 receives an IO request 7300 and analyzes the content of the IO request. When the content of the IO request is analyzed to be a write request, the step 7020 is executed. Otherwise, the step 7030 is executed.

(Step 7020) The storage system 300 performs a write process. Incidentally, the write process is a process for storing data of the option 7060 in the logical volume of the destination 73001 stored in the IO request 7300.

(Step 7030) The storage system 300 judges whether the request content is a read request or not. When the request content is a read request, the step 7040 is executed. Otherwise, the step 7060 is executed.

(Step 7040) The storage system 300 performs a read process. Incidentally, the read process is a process for extracting data stored in the logical volume stored in the destination 73001 of the IO request 7300 and returning the data to the host computer which is an IO requester.

(Step 7060) The storage system 300 performs a process for performing each function.

1-21: Process for Performing Each Function

The process performed by the step 7060 in FIG. 25 is as follows.

(1) Processing in the storage system 300 receiving the storage logical path constructing request in the aforementioned logical path constructing process.

(2) Processing in the storage system 300 receiving the storage remote copy start request in the aforementioned remote copy start process.

(3) Processing for receiving the path state acquisition request from the local management computer 100 and transmitting part or all of information stored in the path management information 1220 to the local management computer 100. The request is used not only in the logical path constructing process when the local management computer 100 refers to the state of construction of the logical path of the storage system 300, but also in a path monitoring process in FIG. 30. These pieces of information may be acquired in such a manner that the central management computer 10 receives a user request and transmits the request to the local management computer.

The storage system 300 transmits information specifying the logical path and information specifying the physical path corresponding to the logical path, to the local management computer 100 in accordance with the request as described above. Besides the aforementioned information, the state of the physical path may be included in the information transmitted from the storage system 300 to the local management computer 100 or the central management computer 10 (via the local management computer). By the state of the physical path, the possibility that failure concerned with the physical path will be detected can be improved.

(4) Processing for receiving a copy pair information reference request from the local management computer 100 and transmitting part or all of information stored in the copy pair management information 1210 to the local management computer 100. This request is used in the copy pair start process when the local management computer 100 refers to the start state of the copy pair in the storage system 300. At least as described above, information specifying the copy pair is transmitted to the local management computer 100. Upon reception of a user request, the central management computer 10 may further transmit the request to the local management computer so that these pieces of information can be acquired. Besides the aforementioned information, the copy state information 12103 may be included in information transmitted from the storage system 300 to the local management computer 100 or the central management computer 10 (via the local management computer 100) so that the start state and progress state of remote copying can be grasped.

1-22: Remote Copy Continuation Process by Storage System (Steady-State Copying)

The primary and secondary storage systems 300 start operation of a remote copy continuation process (hereinafter referred to as steady-state copying) when the initial copying process is completed. That is, the primary and secondary storage systems 300 start steady-state copying when data in the primary volume is coincident with data in the secondary volume.

Specifically, the primary storage system 300*a* executes the steady-state copying process when a write request is received after completion of the initial copying process. For example, when the primary storage system 300*a* writes data in the primary volume, the write data is also written in the secondary volume.

Figure 29:
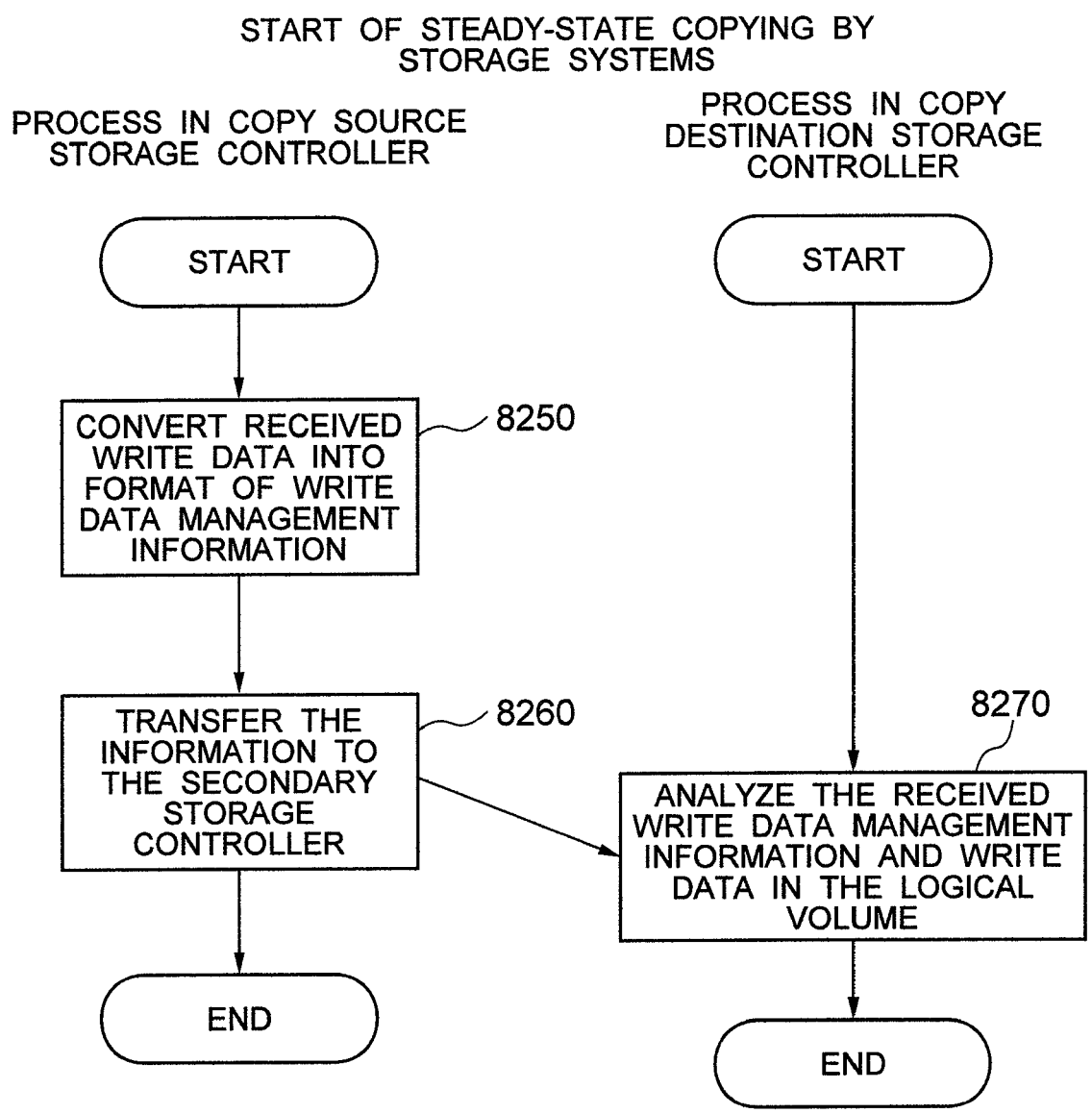
FIG. 29 is a chart showing blocks of the configuration of path management information in the central management computer in Embodiment 1.

FIG. 29 is a flow chart showing an example of the steady-state copying process executed by the storage system 300 in Embodiment 1 of the invention. Incidentally, the steady-state copying may be achieved by another process than the process shown in FIG. 29.

The primary storage system 300*a* receives an IO request 7300. The IO request 7300 is a write request. Then, the primary storage system 300*a* extracts data (write data) requested to be written, from the option 73005 in the IO request 7300. Then, the primary storage system 300*a* extracts the storage ID and the volume ID from the destination 7300 of the IO request 7300.

Then, the primary storage system 300*a* writes the extracted write data in the logical volume Vol identified by the acquired logical volume ID.

Figure 28:
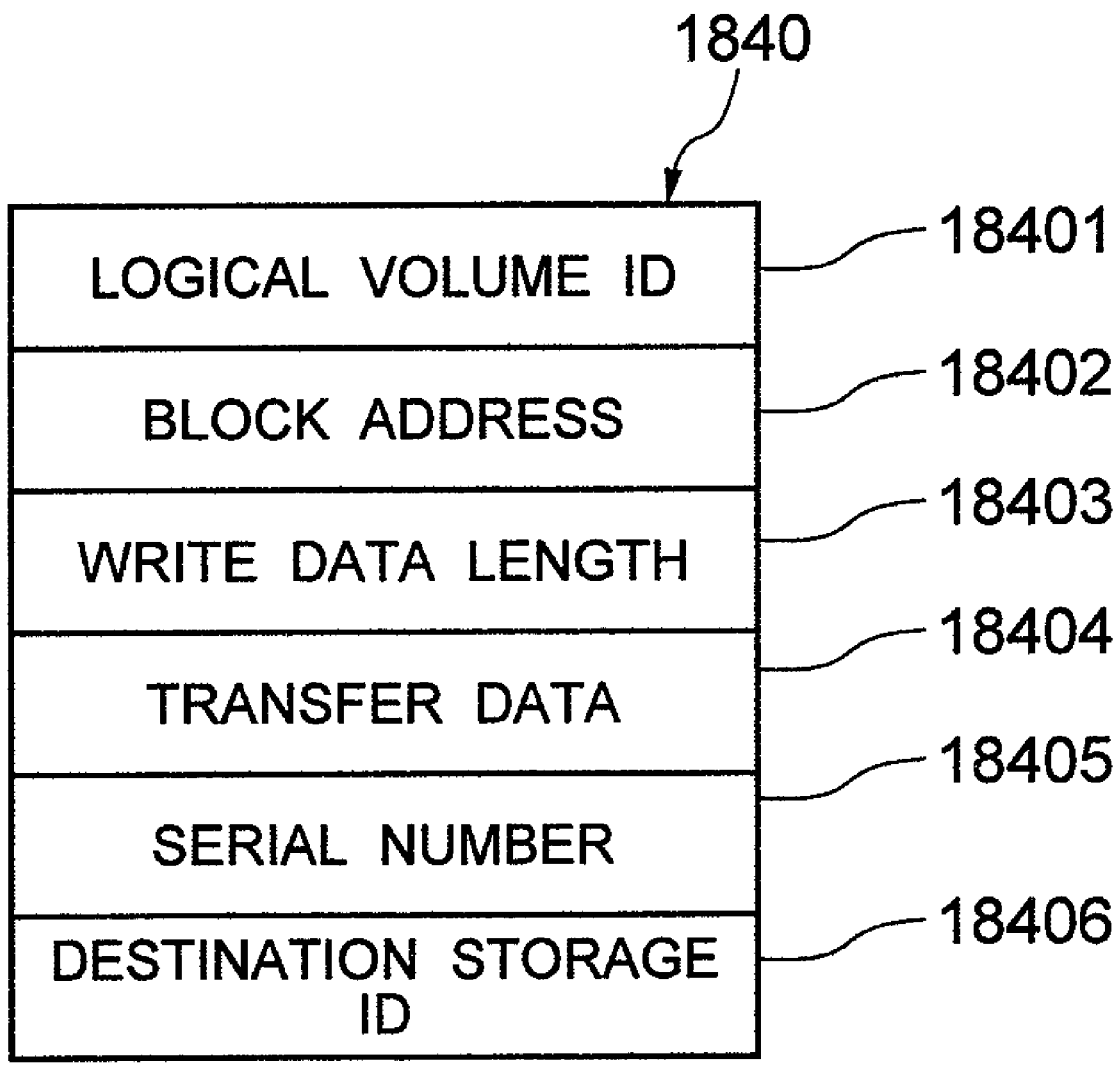
FIG. 28 is a view showing an example of a data transfer frame in Embodiment 1.

(Step 8250) Then, the primary storage system 300*a* creates a data transfer frame 1840 (see FIG. 28).

Specifically, the copy source primary storage system 300*a* selects copy pair management information 1210*a* so that the acquired logical volume ID coincides with the logical volume ID 12102 of the copy pair management information 1210*a*. Then, the copy source primary storage system 300*a* extracts the copy target storage system ID 12104 and the copy target volume ID 12105 from the selected copy pair management information 1210*a*.

Then, the primary storage system 300*a* stores the extracted copy target volume ID 12105 in the logical volume ID 18401 of the data transfer frame 1840. Then, the primary storage system 300*a* stores the address of a block including the write data in the block address 18402 of the data transfer frame 1840.

Then, the primary storage system 300*a* stores the size of the write data in the write data length 18403 of the data transfer frame 1840. Then, the primary storage system 300*a* stores part or all of the write data in the transfer data 18404 of the data transfer frame 1840.

Then, the primary storage system 300a stores the order of creation of the transfer frame 1840 at steady-state copying in the serial number 18405 of the data transfer frame 1840. Then, the primary storage system 300a stores the extracted copy target storage system ID in the transfer destination storage system ID 18406 of the data transfer frame 1840.

(Step 8260) Then, the primary storage system 300a specifies a transferable logical path by referring to the path management information 1240a from the memory 1200. Further, the primary storage system 300a transmits the created data transfer frame 1840 to the secondary storage system 300b by using the logical path.

(Step 8270) The secondary storage system 300b receives the data transfer frame 1840. Then, the secondary storage system 300b writes the transfer data 23D of the data transfer frame 1840 in the logical volume Vol identified by the logical volume ID 18401 of the data transfer frame 1840.

Then, the storage systems 300 terminate the steady-state copying process corresponding to one IO request.

1-23: Path Monitoring Process by Central Management Computer

A path monitoring process by the central management computer 10 will be described below. Path failure is monitored for both the logical path and the physical path. The path monitoring process is achieved when the central management computer 10 issues a path state acquisition request to the storage systems 300 via the local management computers 100 repeatedly.

Figure 30:
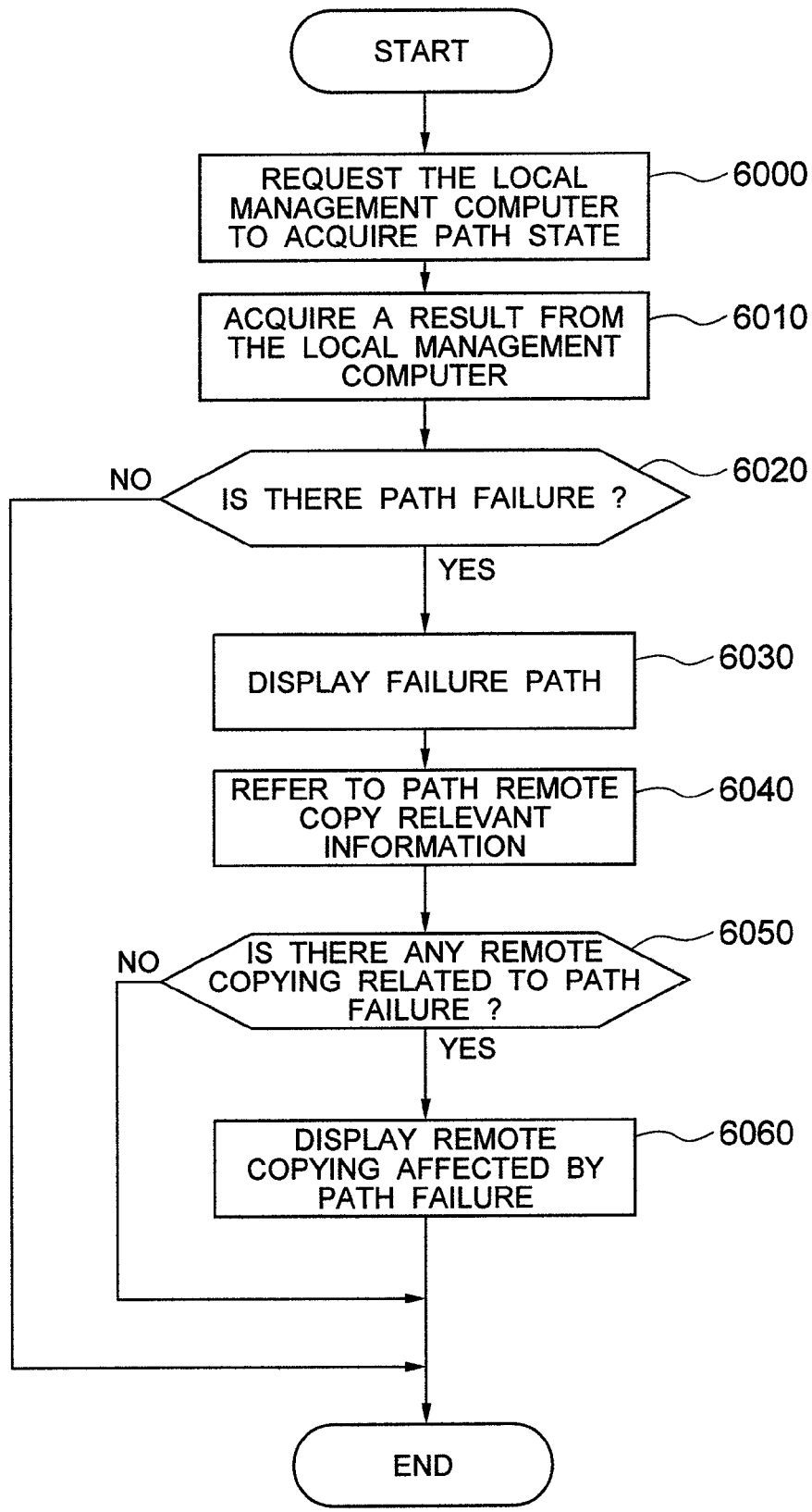
FIG. 30 is a chart showing a flow of a pass monitoring process in the central management computer in Embodiment 1.

FIG. 30 is a flow chart of the path monitoring process by the central management computer 10.

(Step 6000) For path monitoring, the central management computer 10 transmits a path monitoring request to each local management computer 100 periodically. The local management computer 100 creates an IO request as a path state acquisition request in accordance with the request received from the central management computer, transmits the IO request to the storage system 300 and receives information at least including the physical path state from the storage system.

(Step 6010) The central management computer 10 receives information at least including the physical path state from the local management computer 100. Incidentally, the information is information transmitted to the central management computer 10 based on information including the physical path state received as a result of the path state acquisition request by the local management computer.

(Step 6020) The central management computer 10 checks the logical path and the physical path based on the received result as to whether failure occurs or not. When failure in any one of the logical and physical paths is detected, the step 6030 is executed. Otherwise, the path monitoring process is terminated.

(Step 6030) The central management computer 10 specifies at least one logical path corresponding to the failure physical path by referring to the path remote copy relevant information 11 and displays information indicating occurrence of failure in the specified physical path and influence on the specified logical path by using the screen as shown in FIG. 31. Incidentally, another user notification method such as mail or SNMP may be used for displaying such information.

(Step 6040) The central management computer 10 specifies a copy pair (or a copy group) corresponding to the specified physical path by referring to the path remote copy relevant information 11. Incidentally, for specifying of the copy pair, the central copy information may be referred to.

(Step 6050) The central management computer 10 judges whether there is any copy pair or any copy group specified by the step 6040. When there is any copy pair, the step 6060 is executed. Otherwise, the path monitoring process is terminated.

(Step 6060) The central management computer 10 displays information indicating influence on the specified copy pair (or the copy group) as shown in FIG. 31. Incidentally, another user notification method such as mail or SNMP may be used for displaying such information.

Figure 32:
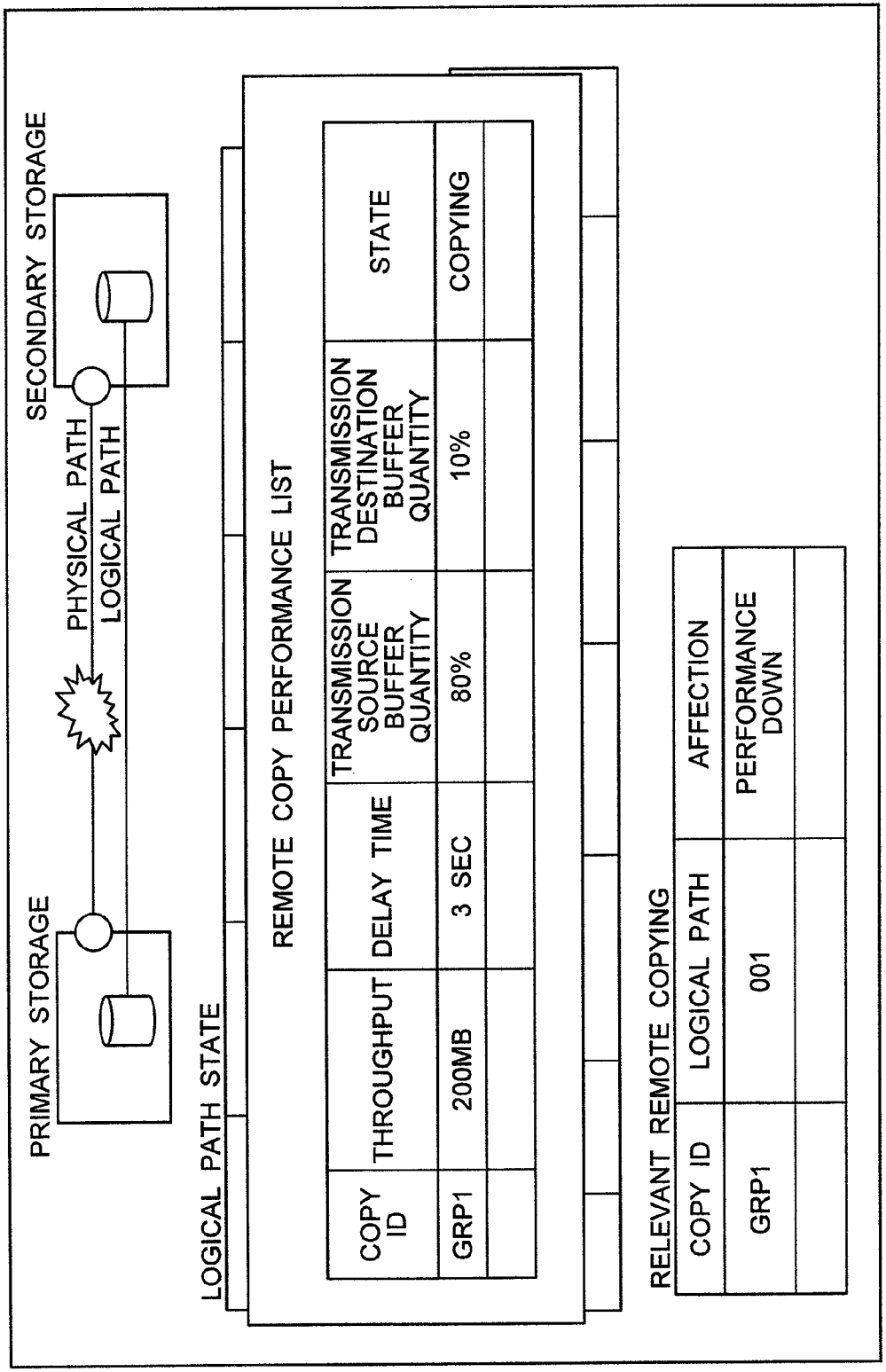
FIG. 32 is a view showing a transfer performance screen of remote copying in the central management computer 10 in Embodiment 1.

Incidentally, when the logical path specified by referring to the path remote copy relevant information 11 corresponds to only the physical path where failure is detected, a character string (e.g. 'failure') indicating that data transfer in remote copying cannot be made (or will fail) may be displayed. Similarly, when the logical path specified by referring to the path remote copy relevant information 11 corresponds to plural physical paths and failure occurs in only a part of the physical paths but the other part of the physical paths are normal, data transfer can be made but a remote copy performance screen as shown in FIG. 32 may be displayed together with a message (or information) for indicating the possibility that transfer performance may be affected. The performance information assumed in this embodiment is information such as throughput or delay time of data in remote copying, which is measured by the storage system 300.

Although the flow chart shown in FIG. 30 shows the case where the central management computer 10 acquires the presence/absence of failure in the storage ports or physical paths from the storage system 300 via the local management computer repeatedly, another method may be used if information for specifying the physical path where failure occurs can be received by the central management computer 10 or management system. For example, when failure in a storage port or physical path is detected, the storage system 300 may transmit notification information designating the identifier of the storage port or physical path where failure occurs, to the central management computer 10 or the management system and the central management computer 10 or the management system can receive the notification information, instead of the steps 6000 and 6010. Further, the flow chart shown in FIG. 30 may be started with the reception of the notification information as a turning point. Incidentally, the notification information may be relayed by the host computer 200. Further, the notification information including information for specifying the physical path may be transmitted from the communication apparatus. Incidentally, examples of the information for specifying the physical path are as follows.

(Example 1) When the management system manages identifiers of communication apparatuss forming respective physical paths as physical path information, the information for specifying the physical path is an identifier of a communication apparatus.

(Example 2) When the management system manages identifiers of communication apparatuss forming respective physical paths and identifiers of networks between the communication apparatuss as physical path information, the information for identifying the physical path is an identifier of a communication apparatus and an identifier of a network.

As one sphere of the step 6060, identification information of copy pairs or copy groups not affected by path failure may be displayed by referring to the copy information 113C, the path information 115C or the path remote copy relevant information 11.

As described above, in the computer system 1 according to Embodiment 1 of the invention, corresponding remote copying can be detected when path failure is detected.

Embodiment 2

According to a computer system 2 in Embodiment 2 of the invention, failure in an extender used for enlarging the distance between the primary and secondary storage systems performing remote copying can be managed as one of path failures while associated with the state of remote copying. The extender is a device which transforms data received from the storage systems via fibre channel or FICON into data for IP network having no limit in transfer distance in order to extend the data transfer distance.

Though not shown, a primary storage system 300a1 and a primary storage system 300a2 are coupled to a local management computer 100a and a host computer 200a while a secondary storage system 300b1 and a secondary storage system 300b2 are coupled to a local management computer 100b and a host computer 200b. Items not particularly described are the same as those in Embodiment 1.

Figure 33:
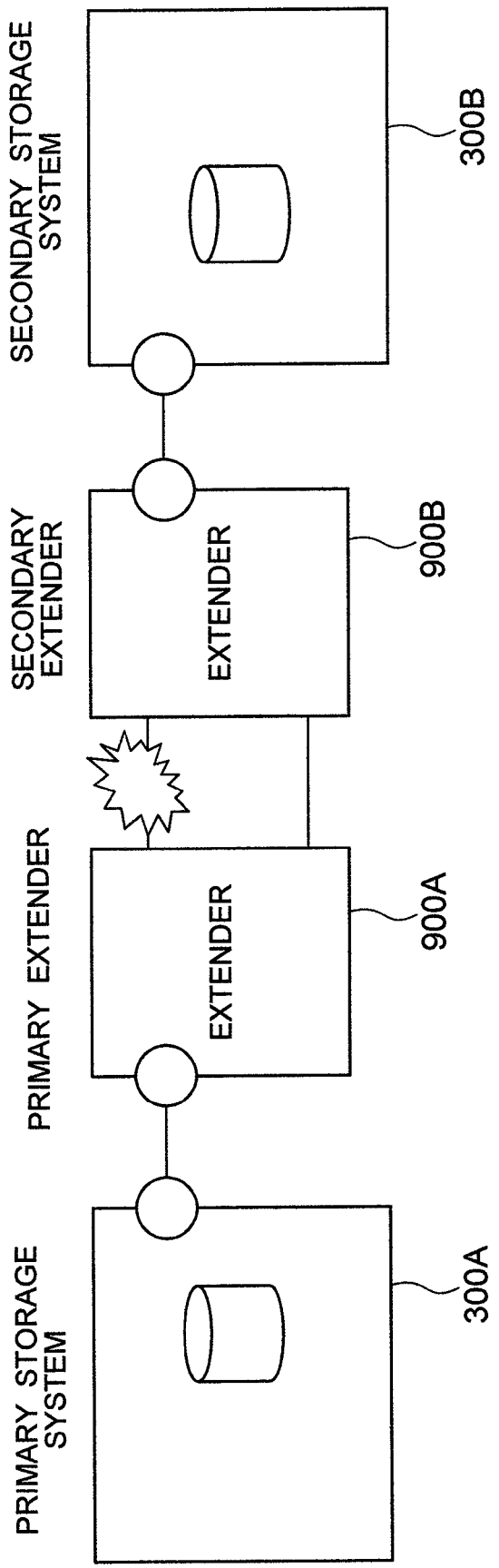
FIG. 33 is a diagram showing a computer system provided with extenders in a central management computer in Embodiment 2.

FIG. 33 shows the computer system 2 including extenders. In FIG. 33, two, primary and secondary extenders 900A and 900B are coupled between the storage systems 300a and 300b.

Plural lines may be provided between the extenders. Even when some of the lines failed, physical path failure cannot be detected from the storage systems 300. However, the real line speed of the physical path is reduced from the storage systems 300.

Therefore, when failure in lines between the extenders is detected by the central management computer, performance information of remote copying is displayed so that useful information can be presented to the user.

Each local management computer 100 acquires information of the extenders on each site.

Figure 34:
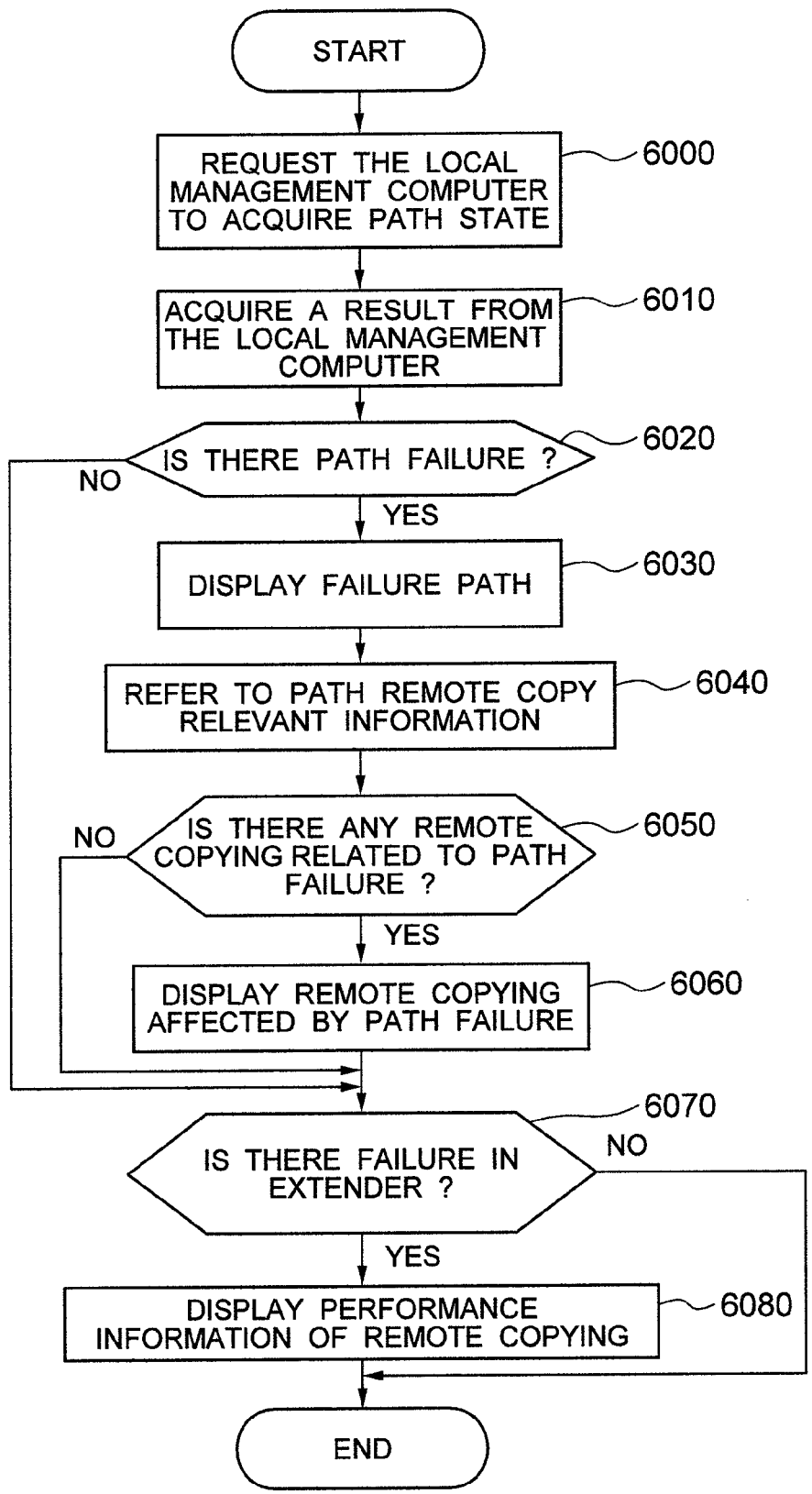
FIG. 34 is a flow chart of a path monitoring process executed by the central management computer in Embodiment 2.

FIG. 34 is a flow chart of a path monitoring process by the central management computer 10. Incidentally, because the flow chart of FIG. 34 is almost the same as the flow chart of FIG. 30, only a point of difference between the two flow charts will be described.

In step 6010, the central management computer 10 also acquires information from the extenders.

Further in step 6070, the central management computer 10 judges whether there is failure in the extenders. When there is failure (Yes in the step 6070), the central management computer 10 displays the performance information screen of remote copying as shown in FIG. 32.

Embodiment 3

According to a computer system 3 in Embodiment 3 of the invention, copy pairs distributed to storage systems 300 can be bundled so as to be managed as one copy group. The computer system 3 can manage the relationship between remote copying due to the storage systems 300 and paths.

Though not shown, a primary storage system 300a1 and a primary storage system 300a2 are coupled to a local management computer 100a and a host computer 200a while a secondary storage system 300b1 is coupled to a local management computer 100b and a host computer 200b. Items not particularly described are the same as those in Embodiment 1.

Figure 35:
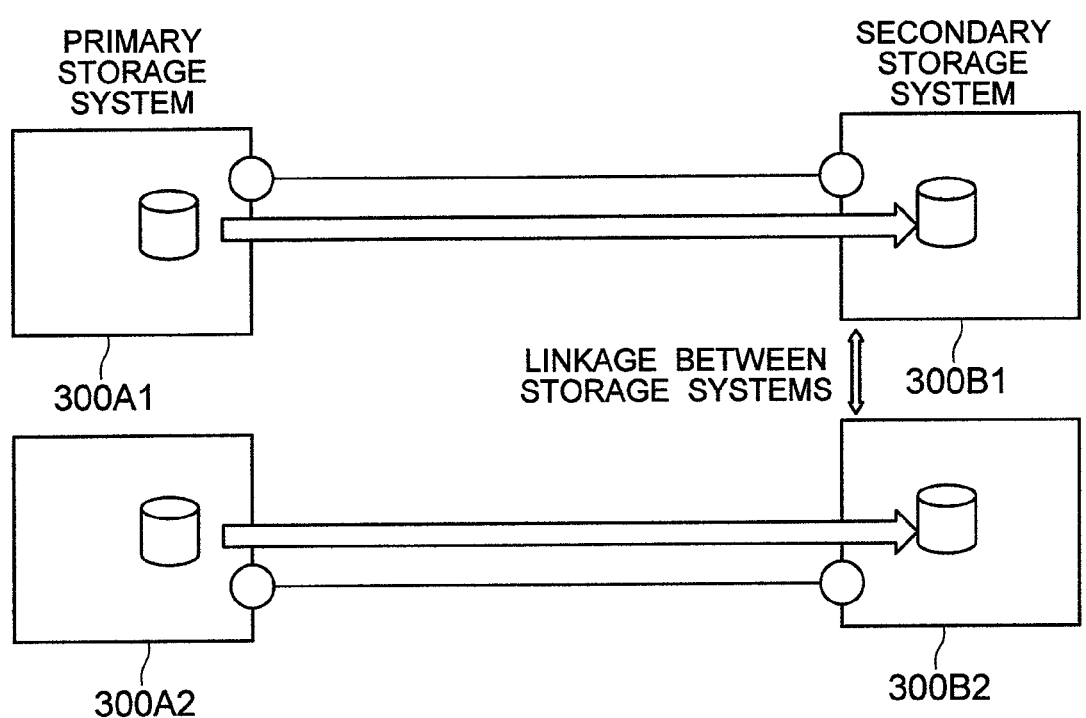
FIG. 35 is a diagram showing system configuration in Embodiment 3.

By bundling a plurality of remote copying, remote copying formed over a plurality of storage systems 300 can be achieved as shown in FIG. 35. This can achieve remote copying having a large-scale volume structure which cannot be processed by one storage system. For the achievement, the storage systems 300 are linked to one another and an ID unique in the system is given to the extended copy group ID 12107 of the copy pair management information 1210 in each storage system so that management is performed.

However, in the aforementioned remote copying, there is a possibility that path failure in one storage system may cause remote copy failure in another storage system. It is therefore important that the user is notified of the fact that all the plurality of remote copying linked to one another may be affected by path failure.

The flow chart of the path monitoring process by the central management computer 10 in FIG. 30 is different in the following steps. That is, when remote copying related to path failure is detected by the judgment in the step 6050, the central management computer 10 searches not only for remote copying heretofore detected but also for other remote copying common in terms of the extended copy group ID 11310 of the remote copying in the copy information entry 113 and displays all the detected remote copying on the screen shown in FIG. 31.

Embodiment 4

Figure 36A:
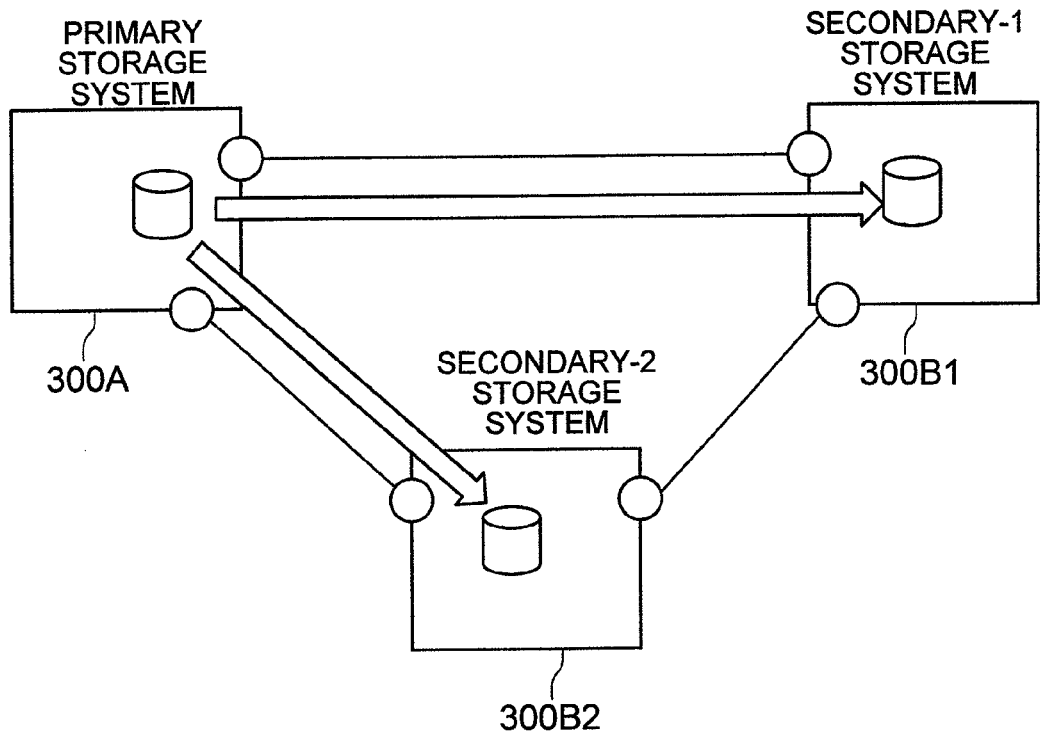
FIG. 36A is a block diagram showing system configuration in Embodiment 4.
Figure 36B:
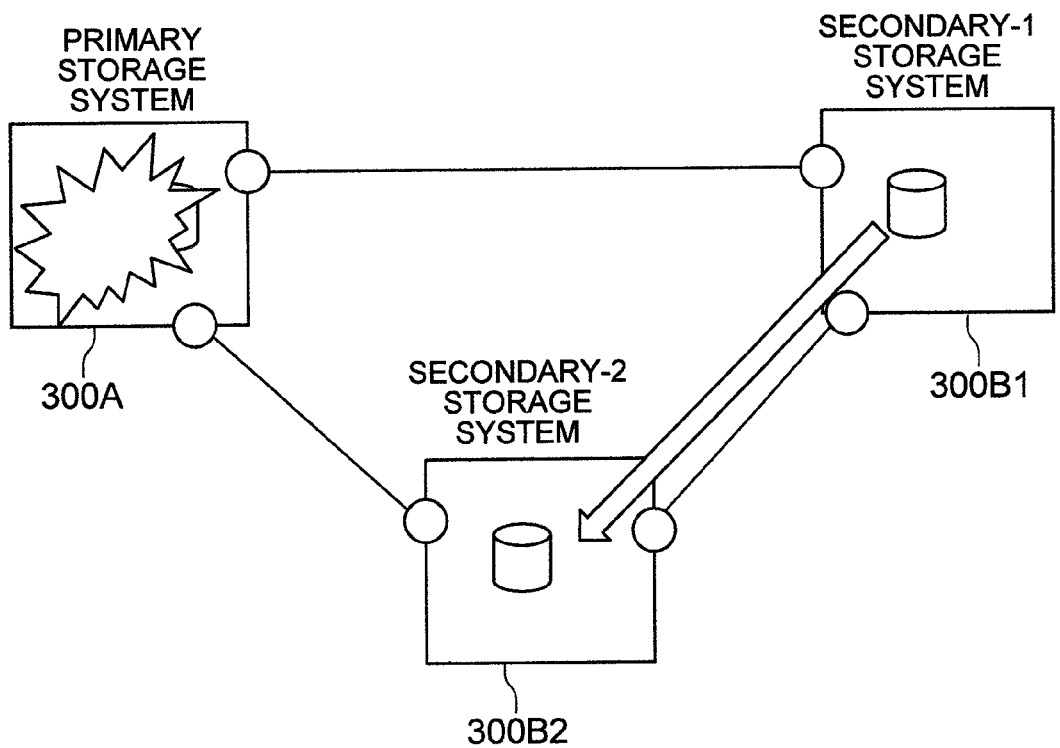
FIG. 36B is a block diagram showing operation after a primary storage system is affected by disaster in Embodiment 4.

According to a computer system 4 in Embodiment 4 of the invention, as shown in FIG. 36A, the storage systems 300 are configured so that data in one logical volume in one storage system can be transferred as remote copying to plural storage systems. As shown in FIG. 36B, in the storage systems in Embodiment 4, a remote copying process can be continued between plural secondary storage systems even when failure occurs in the primary storage system or the host computer 200.

Though not shown, a primary storage system 300a1 and a primary storage system 300a2 are coupled to a local management computer 100a and a host computer 200a while a secondary-1 storage system 300b1 is coupled to a local management computer 100b and a host computer 200b and a secondary-2 storage system 300b2 is coupled to another local management computer and another host computer. Items not particularly described are the same as those in Embodiment 1.

Incidentally, one logical path is set between the storage port of the primary storage system 300a and the storage port of the secondary-1 storage system 300b1 while another logical path is set between the storage port of the primary storage system 300a and the storage port of the secondary-2 storage system 300b2. At least one copy pair in remote copying from the primary storage system 300a to the secondary-1 storage system 300b1 forms one copy group while at least one copy pair in remote copying from the primary storage system 300a to the secondary-2 storage system 300b2 forms one copy group.

In this case, when failure occurs in the path between the storage systems 300b1 and 300b2 while remote copying is performed from the storage system 300a to both the storage systems 300b1 and 300b2, there is a possibility that remote copying cannot be continued at the time of failure in the storage system 300a or the host computer 200. It is therefore important to Embodiment 4 that failure in the path between the storage systems 300b1 and 300b2 is displayed as failure related to remote copying between the storage systems 300a and 300b1 and between the storage systems 300a and 300b2.

Therefore, in the central management computer 10, relevant path information is added to the additional information 1104 of the path remote copy relevant information. For example, when the relationship between the storage systems 300a and 300b1 is registered in the path remote copy relevant information 11, the logical path ID between the storage systems 300b1 and 300b2 is recorded in the additional information 1104.

The flow chart of the path monitoring process by the central management computer 10 in FIG. 30 is different in the following step.

In step 6050, the central management computer 10 applies the path failure range not only to the logical path ID 1101 and the physical path ID 1102 but also to the logical path written in the additional information and detects relevant remote copying.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A data storage system comprising:
a first storage system as a first primary storage system, which has first storage ports and first logical volumes which store write data received from a computer coupled to the first storage system;
a second storage system as a first secondary storage system, which has second storage ports coupled to the first storage ports, and second logical volumes which store copies of data of the first logical volumes by remote copying;
a third storage system as a second primary storage system, which has third storage ports and third logical volumes which store write data received from the computer coupled to the third storage system;
a fourth storage system as a second secondary storage system, which has fourth storage ports coupled to the third storage ports, and fourth logical volumes which store copies of data of the third logical volumes by remote copying; and
a management system, which stores copy information which holds correspondence of copy pairs formed from the first logical volumes and the second logical volumes and formed from the third logical volumes and the fourth logical volumes, with copy groups concerned with a sequence of write data in the computer, where a first copy pair formed from the first logical volumes and the second logical volumes, and a second copy pair formed from the third logical volumes and the fourth logical volumes, are linked and bundled together as a bundled copy group for effecting bundled remote copying of data extending across the first and second primary storage systems over to the first and second secondary storage systems,
wherein the management system stores path remote copy relevant information which indicates correspondence of physical paths including the first storage ports, the second storage ports, the third storage ports, the fourth storage ports, logical paths, and the copy groups including the bundled copy group by remote copying, and
wherein the management system receives failure information designating a certain physical path included in the physical paths, and specifies a certain logical path which is part of the logical paths and which corresponds to the certain physical path and the bundled copy group which corresponds to the certain logical path, by referring to the path remote copy relevant information, and displays identification information of the bundled copy group as a copy group affected by the failure in the certain physical path.

2. A data storage system according to claim 1,
wherein the data storage system further comprises a communication apparatus coupled to part or all of the first storage ports, part or all of the second storage ports, part or all of the third storage ports, and part or all of the fourth storage ports, and
wherein the failure information is transmitted by any one of the first storage system, the second storage system, the third storage system, the fourth storage system, or the communication apparatus.

3. A data storage system according to claim 2, wherein the data storage system displays performance information concerned with remote copying of the bundled copy group, based on reception of the failure information.

4. A data storage system according to claim 3,
wherein the copy information holds copy types of the copy groups,
wherein a copy type of the bundled copy group is specified based on the copy information, and information displayed as the performance information is changed based on the copy type specified.

5. A data storage system according to claim 2,
wherein the management system receives information concerned with copy states of the copy groups from the first storage system, the second storage system, the third storage system, and the fourth storage system, and stores the copy states of the copy groups based on the information, and
wherein the management system displays identification information of the bundled copy group asynchronously with display concerned with change in a copy state of the bundled copy group.

6. A data storage system according to claim 5,
wherein, in the copy state of the bundled copy group is a state of normally copying, the management system transmits a request to the first storage system, the second storage system, the third storage system and or the fourth storage system, to associate one of the physical paths with the certain logical path, in response to a user request to designate one of the physical paths.

7. A data storage system comprising:
a first storage system as a first primary storage system, which has first storage ports and first logical volumes which store write data received from a computer coupled to the first storage system;
a second storage system as a first secondary storage system, which has second storage ports coupled to the first storage ports, and second logical volumes which store copies of data of the first logical volumes by remote copying;
a third storage system as a second primary storage system, which has third storage ports and third logical volumes which store write data received from the computer coupled to the third storage system;
a fourth storage system as a second secondary storage system, which has fourth storage ports coupled to the third storage ports, and fourth logical volumes which store copies of data of the third logical volumes by remote copying; and
a management system, which stores copy information which holds correspondence of copy pairs formed from the first logical volumes and the second logical volumes and formed from the third logical volumes and the fourth logical volumes, with copy groups concerned with a sequence of write data in the computer, where a first copy pair formed from the first logical volumes and the second logical volumes, and a second copy pair formed from the third logical volumes and the fourth logical volumes, are linked and bundled together as a bundled copy group for effecting bundled remote copying of data extending across the first and second primary storage systems over to the first and second secondary storage systems, wherein the management system stores path remote copy relevant information which indicates correspondence of: physical paths including the first storage ports, the second storage ports, the third storage ports, the fourth storage ports, logical paths, and the copy groups including the bundled copy group by remote copying, and wherein the management system receives failure information designating a certain physical path included in the physical paths, determines both a certain logical path which is part of the logical paths and which corresponds to the certain physical path, and a bundled copy group which corresponds to the certain logical path, by referring to the path remote copy relevant information, and displays identification information of a determined said bundled copy group as a copy group affected by the failure in the certain physical path.

8. A data storage system according to claim 7, wherein the data storage system further comprises a communication apparatus coupled to part or all of the first storage ports, part or all of the second storage ports, part or all the third storage ports, part or all the fourth storage ports, and wherein the failure information is transmitted by any one of the first storage system, the second storage system, the third storage system, the fourth storage system, or the communication apparatus.

9. A data storage system according to claim 8, wherein the data storage system displays performance information concerned with remote copying of the bundled copy group, based on reception of the failure information.

10. A data storage system according to claim 9, wherein the copy information holds copy types of the copy groups, wherein a copy type of the bundled copy group is determined based on the copy information, and information displayed as the performance information is changed based on the copy type determined.

11. A data storage system according to claim 8, wherein the management system receives information concerned with copy states of the copy groups from the first storage system, the second storage system, the third storage system and the fourth storage system, and stores the copy states of the copy groups based on the information, and wherein the management system displays identification information of the bundled copy group asynchronously with display concerned with change in a copy state of the bundled copy group.

12. A data storage system according to claim 11, wherein, in the copy state of the bundled copy group is a state of normally copying, the management system transmits a request to the first storage system, the second storage system, the third storage system and or the fourth storage system, to associate one of the physical paths with the certain logical path, in response to a user request to designate one of the physical paths.

13. A remote copy management method implemented in a data storage system including:

a first storage system as a first primary storage system, which has first storage ports and first logical volumes which store write data received from a computer coupled to the first storage system;

a second storage system as a first secondary storage system, which has second storage ports coupled to the first storage ports, and second logical volumes which store copies of data of the first logical volumes by remote copying;

a third storage system as a second primary storage system, which has third storage ports and third logical volumes which store write data received from the computer coupled to the third storage system; and a fourth storage system as a second secondary storage system, which has fourth storage ports coupled to the third storage ports, and fourth logical volumes which store copies of data of the third logical volumes by remote copying;

the remote copy management method comprising:

storing copy information which holds correspondence of copy pairs formed from the first logical volumes and the second logical volumes and formed from the third logical volumes and the fourth logical volumes, with copy groups concerned with a sequence of write data in the computer, where a first copy pair formed from the first logical volumes and the second logical volumes, and a second copy pair formed from the third logical volumes and the fourth logical volumes, are linked and bundled together as a bundled copy group for effecting bundled remote copying of data extending across the first and second primary storage systems over to the first and second secondary storage systems, storing path remote copy relevant information which indicates correspondence of physical paths including the first storage ports, the second storage ports, the third storage ports, the fourth storage ports, logical paths, and the copy groups including the bundled copy group by remote copying, and receiving failure information designating a certain physical path included in the physical paths, and specifying a certain logical path which is part of the logical paths and which corresponds to the certain physical path and the bundled copy group which corresponds to the certain logical path, by referring to the path remote copy relevant information, and displaying identification information of the bundled copy group as a copy group affected by the failure in the certain physical path.

14. A remote copy management method according to claim 13, wherein the data storage system further comprises a communication apparatus coupled to part or all of the first storage ports, part or all of the second storage ports, part or all of the third storage ports, and part or all of the fourth storage ports, and wherein the failure information is transmitted by any one of the first storage system, the second storage system, the third storage system, the fourth storage system, or the communication apparatus.

15. A remote copy management method according to claim 14, further comprising displaying performance information concerned with remote copying of the bundled copy group, based on reception of the failure information.

16. A remote copy management method according to claim 15, wherein the copy information holds copy types of the copy groups, wherein a copy type of the bundled copy group is specified based on the copy information, and information displayed as the performance information is changed based on the copy type specified.

17. A remote copy management method according to claim 14, further comprising:
- receiving information concerned with copy states of the copy groups from the first storage system, the second storage system, the third storage system, and the fourth storage system, and storing the copy states of the copy groups based on the information, and
- displaying identification information of the bundled copy group asynchronously with display concerned with change in a copy state of the bundled copy group.

18. A remote copy management method according to claim 17,
- wherein, in the copy state of the bundled copy group is a state of normally copying, the remote copy management method transmitting a request to the first storage system, the second storage system, the third storage system and or the fourth storage system, to associate one of the physical paths with the certain logical path, in response to a user request to designate one of the physical paths.

* * * * *